US012644949B2

(12) United States Patent
Ren et al.

(10) Patent No.: US 12,644,949 B2
(45) Date of Patent: Jun. 2, 2026

(54) ANGLE CALIBRATION FOR CROSS-LINK INTERFERENCE ANGLE-OF-ARRIVAL ESTIMATION

(71) Applicant: QUALCOMM Incorporated, San Diego, CA (US)

(72) Inventors: Yuwei Ren, Beijing (CN); Weimin Duan, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 561 days.

(21) Appl. No.: 18/040,394

(22) PCT Filed: Sep. 3, 2021

(86) PCT No.: PCT/CN2021/116378
§ 371 (c)(1),
(2) Date: Feb. 2, 2023

(87) PCT Pub. No.: WO2022/062877
PCT Pub. Date: Mar. 31, 2022

(65) Prior Publication Data
US 2023/0358844 A1 Nov. 9, 2023

(30) Foreign Application Priority Data

Sep. 27, 2020 (WO) ................ PCT/CN2020/118057

(51) Int. Cl.
*G01S 5/00* (2006.01)
*G01S 5/02* (2010.01)
(Continued)

(52) U.S. Cl.
CPC ............ *G01S 5/0036* (2013.01); *G01S 5/021* (2013.01); *G01S 5/04* (2013.01); *G01S 5/0009* (2013.01); *G01S 5/08* (2013.01)

(58) Field of Classification Search
CPC .. G01S 5/0036; G01S 5/0009; G01S 5/02025; G01S 5/021; G01S 5/04;
(Continued)

(56) References Cited

U.S. PATENT DOCUMENTS 10,477,420 B2 * 11/2019 Ghosh ................... H04W 24/08
10,903,920 B2 1/2021 Azarian Yazdi et al.
(Continued)

FOREIGN PATENT DOCUMENTS

CN 111417199 A 7/2020
EP 3567759 A1 11/2019
(Continued)

OTHER PUBLICATIONS

3GPP TR 38.901: "3rd Generation Partnership Project, Technical Specification Group Radio Access Network, Study on Channel Model for Frequencies From 0.5 to 100 GHz (Release 16)", 3GPP Standard, Technical Report, 3GPP TR 38.901, 3rd Generation Partnership Project, Mobile Competence Centre, 650, Route Des Lucioles, F-06921 Sophia-Antipolis Cedex, France, vol. RAN WG1, No. V16.0.0, Oct. 10, 2019, XP051785393, 101 pages, section 7.1.3, section 7.5.
(Continued)

*Primary Examiner* — Chuong P Nguyen
(74) *Attorney, Agent, or Firm* — Thien T. Nguyen

(57) ABSTRACT
Techniques for enabling a cross-link interference (CLI) based uplink (UL) angle-of-arrival (AoA) estimations are disclosed. A victim user equipment (UE) may be configured with CLI resources to measure CLIs from one or more aggressor UEs. The victim UE may take the CLI opportunities also to estimate the AoAs of the UL signals from the aggressor UEs. In this way, UE's location estimation may be enhanced.

30 Claims, 14 Drawing Sheets

(51) Int. Cl.
*G01S 5/04* (2006.01)
*G01S 5/08* (2006.01)

(58) Field of Classification Search
CPC ....... G01S 5/08; H04L 5/0094; H04L 5/0073;
H04W 72/541; H04B 7/0617
USPC ........................................................ 342/451
See application file for complete search history.

(56) References Cited

U.S. PATENT DOCUMENTS

| | | | | |
|---|---|---|---|---|
| 11,178,670 | B2 * | 11/2021 | Estevez | H04W 24/08 |
| 11,233,623 | B2 * | 1/2022 | Xu | H04L 5/0073 |
| 11,418,988 | B2 * | 8/2022 | Jin | H04W 16/18 |
| 11,864,217 | B2 * | 1/2024 | Kim | H04L 5/0048 |
| 12,289,275 | B2 * | 4/2025 | Ibrahim | H04W 24/08 |
| 12,526,666 | B2 * | 1/2026 | Ren | H04W 24/08 |
| 2010/0197239 | A1 | 8/2010 | Catovic et al. | |
| 2018/0205427 | A1 * | 7/2018 | Ghosh | H04W 24/08 |
| 2020/0037185 | A1 | 1/2020 | Ghosh et al. | |
| 2020/0145079 | A1 | 5/2020 | Marinier et al. | |
| 2021/0050983 | A1 * | 2/2021 | Manolakos | H04W 24/10 |
| 2021/0084655 | A1 * | 3/2021 | Estevez | H04B 7/0626 |
| 2023/0164610 | A1 * | 5/2023 | Xu | H04W 24/10 370/329 |
| 2023/0262493 | A1 * | 8/2023 | Ren | H04L 5/0048 370/252 |
| 2023/0276275 | A1 * | 8/2023 | Ren | H04W 24/10 342/125 |
| 2024/0114480 | A1 * | 4/2024 | Duan | G01S 5/06 |
| 2024/0118366 | A1 * | 4/2024 | Ren | G01S 5/0215 |
| 2024/0421925 | A1 * | 12/2024 | Xu | H04L 5/006 |

FOREIGN PATENT DOCUMENTS

| | | | |
|---|---|---|---|
| WO | 2018137444 | A1 | 8/2018 |
| WO | WO-2018204098 | A1 | 11/2018 |
| WO | 2019031816 | A1 | 2/2019 |
| WO | 2019101287 | A1 | 5/2019 |
| WO | WO-2020143706 | A1 | 7/2020 |

OTHER PUBLICATIONS

CATT: "Summary of UE and gNB Measurements for NR Positioning", 3GPP TSG RAN WG1 Meeting #98, R1-1908574, FL Summary of NR POS Measurements, 3rd Generation Partnership Project, Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Sep. 3, 2019, XP051765182, 29 pages, section 3.4.
Supplementary Partial European Search Report—EP21871249—Search Authority—Munich—Sep. 27, 2024.
AT&T: "Overview of Physical Layer Enhancements for IAB", 3GPP Draft, 3GPP TSG RAN WG1 Meeting #92bis, R1-1804662, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 15, 2018 (Apr. 15, 2018), XP051426930, 7 Pages, section 2.1; pp. 2-3, the whole document.
International Search Report and Written Opinion—PCT/CN2020/118057—ISA/EPO—Jun. 28, 2021.
International Search Report and Written Opinion—PCT/CN2021/116378—ISA/EPO—Nov. 26, 2021.
Qualcomm Incorporated: "Remaining Issues of CLI RRM Performance Requirements," 3GPP TSG-RAN WG4 Meeting #94-e-bis, R4-2003419, Electronic Meeting, Apr. 20-30, 2020, (Apr. 30, 2020), 2 pages, the whole document.
Jun-Jie C., et al., "Relative Localization Systems and Algorithms for Wireless Sensor Networks", Networking, Sensing and ControL, 2008, ICNSC 2008. IEEE International Conference ON, IEEE, Piscataway, NJ, USA, Apr. 6, 2008, pp. 1439-1444, XP031255396, Section III.
Supplementary European Search Report—EP21871249—Search Authority—Munich—Feb. 4, 2025.

* cited by examiner

RTT$_1$

AoA$_1$

Device Location

Measurement Uncertainty

1500

UE

1505
Measure CLI signals comprising UL signals transmitted from other UEs

1515
Determine AoAs of CLI signals based on measurements

1525
Report AoAs of CLI signals to anchor node

Network

1530
Receive report of AoAs of CLI signals of other UEs

1540
Refine UE location based on AoAs and/or forward AoAs to anchor node

ANGLE CALIBRATION FOR CROSS-LINK INTERFERENCE ANGLE-OF-ARRIVAL ESTIMATION

CROSS-REFERENCE TO RELATED APPLICATION

The present application for patent claims the benefit of Patent Cooperation Treaty (PCT) Application No. PCT/CN2020/118057 entitled "ANGLE CALIBRATION FOR CROSS-LINK INTERFERENCE ANGLE-OF-ARRIVAL ESTIMATION," filed Sep. 27, 2020, and PCT/CN2021/116378 entitled "ANGLE CALIBRATION FOR CROSS-LINK INTERFERENCE ANGLE-OF-ARRIVAL ESTIMATION," filed Sep. 3, 2021, both of which are assigned to the assignee hereof, and expressly incorporated herein by reference in their entirety.

INTRODUCTION

Various aspects described herein generally relate to wireless communication systems, and more particularly to angle calibration for cross-link interference (CLI) angle-of-arrival (AoA) estimation in wireless networks, e.g., for estimating positions.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or Worldwide Interoperability for Microwave Access (WiMax)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps).

To support position estimations in terrestrial wireless networks, a mobile device can be configured to measure and report the observed time difference of arrival (OTDOA) or reference signal timing difference (RSTD) between reference radio frequency (RF) signals received from two or more network nodes (e.g., different base stations or different transmission points (e.g., antennas) belonging to the same base station). The mobile device can also be configured to report time of arrival (ToA) of RF signals.

With OTDOA, when the mobile device reports the time difference of arrival (TDOA) between two network nodes, the location of the mobile device is then known to lie on a hyperbola with the locations of the two network nodes as the foci. Measuring TDOAs between multiple pairs of network nodes allows solving the for mobile device's position as intersections of the hyperbolas.

Round trip time (RTT) is another technique for determining a position of a mobile device. RTT is a two-way messaging technique (network node→mobile device and mobile device→network node), with both the mobile device and the network node reporting their receive-transmit (Rx-Tx) time differences to the entity such as an evolved serving mobile location center (eSMLC) or location management function (LMF) that computes the mobile device position. This allows for computing the back-and-forth flight time between the mobile device and the network node. The location of the mobile device is then known to lie on a circle with center at the network node's position. Reporting RTTs with multiple network nodes allows the positioning entity to solve for the mobile device's position as intersections of the circles.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary user equipment (UE) is disclosed. The UE may comprise a processor, a memory, and a transceiver. The processor, the memory, and/or the transceiver may be configured to receive cross-link interference (CLI) resources configuration from a network node. The CLI resources configuration may specify CLI opportunities comprising resources scheduled for the UE to measure one or more uplink (UL) signals from corresponding one or more other UEs. The processor, the memory, and/or the transceiver may also be configured to estimate and report one or more angles-of-arrival (AoAs) of the one or more uplink (UL) signals of the one or more other UEs received during the CLI opportunities.

An exemplary method performed by a user equipment (UE) is disclosed. The method may comprise receiving cross-link interference (CLI) resources configuration from a network node. The CLI resources configuration may specify CLI opportunities comprising resources scheduled for the UE to measure one or more uplink (UL) signals from corresponding one or more other UEs. The method may also comprise estimating and report one or more angles-of-arrival (AoAs) of the one or more uplink (UL) signals of the one or more other UEs received during the CLI opportunities.

Another exemplary user equipment (UE) is disclosed. The UE may comprise means for receiving cross-link interference (CLI) resources configuration from a network node. The CLI resources configuration may specify CLI opportunities comprising resources scheduled for the UE to measure one or more uplink (UL) signals from corresponding one or more other UEs. The UE may also comprise means for estimating and report one or more angles-of-arrival (AoAs) of the one or more uplink (UL) signals of the one or more other UEs received during the CLI opportunities.

An exemplary non-transitory computer-readable medium storing computer-executable instructions for a user equipment (UE) is disclosed. The computer-executable instructions may comprise one or more instructions causing the UE to receive cross-link interference (CLI) resources configuration from a network node. The CLI resources configuration may specify CLI opportunities comprising resources scheduled for the UE to measure one or more uplink (UL) signals from corresponding one or more other UEs. The computer-executable instructions may also comprise one or more instructions causing the UE to estimate and report one or more angles-of-arrival (AoAs) of the one or more uplink (UL) signals of the one or more other UEs received during the CLI opportunities.

An exemplary network node is disclosed. The network node may comprise a transceiver, a memory, and a processor communicatively coupled to the transceiver and the memory. The processor, the memory, and/or the transceiver may be configured to configure cross-link interference (CLI) resources for a user equipment (UE). The CLI resources configuration may specify CLI opportunities comprising resources scheduled for the UE to measure one or more uplink (UL) signals from corresponding one or more other UEs. The processor, the memory, and/or the transceiver may also be configured to refine a location of the UE based on one or more angles-of-arrival (AoAs) of the one or more uplink (UL) signals of the one or more other UEs received by the UE during the CLI opportunities.

An exemplary method performed by a network node is disclosed. The method may comprise configuring cross-link interference (CLI) resources for a user equipment (UE). The CLI resources configuration may specify CLI opportunities comprising resources scheduled for the UE to measure one or more uplink (UL) signals from corresponding one or more other UEs. The method may also comprise refining a location of the UE based on one or more angles-of-arrival (AoAs) of the one or more uplink (UL) signals of the one or more other UEs received by the UE during the CLI opportunities.

Another exemplary network node is disclosed. The UE may comprise means for configuring cross-link interference (CLI) resources for a user equipment (UE). The CLI resources configuration may specify CLI opportunities comprising resources scheduled for the UE to measure one or more uplink (UL) signals from corresponding one or more other UEs. The UE may also comprise means for refining a location of the UE based on one or more angles-of-arrival (AoAs) of the one or more uplink (UL) signals of the one or more other UEs received by the UE during the CLI opportunities.

An exemplary non-transitory computer-readable medium storing computer-executable instructions for a network node is disclosed. The computer-executable instructions may comprise one or more instructions causing the network node to configure cross-link interference (CLI) resources for a user equipment (UE). The CLI resources configuration may specify CLI opportunities comprising resources scheduled for the UE to measure one or more uplink (UL) signals from corresponding one or more other UEs. The computer-executable instructions may also comprise one or more instructions causing the network node to refine a location of the UE based on one or more angles-of-arrival (AoAs) of the one or more uplink (UL) signals of the one or more other UEs received by the UE during the CLI opportunities.

An exemplary user equipment (UE) is disclosed. The UE may comprise a processor, a memory, and a transceiver. The processor may be coupled to the memory and the transceiver and may be configured to measure one or more cross-link interference (CLI) signals. The one or more CLI signals may comprise one or more uplink (UL) signals transmitted from one or more other UEs to a network node during one or more CLI opportunities. The one or more CLI opportunities may comprise measurement resources that coincide with UL transmissions corresponding to the one or more CLI signals. The processor, the memory, and/or the transceiver may also be configured to determine one or more angles-of-arrival (AoA) of the one or more CLI signals based on measurements of the one or more CLI signals. The processor, the memory, and/or the transceiver may further be configured to report the one or more AoAs of the one or more CLI signals to an anchor node.

An exemplary method performed by a user equipment (UE) is disclosed. The method may comprise measuring one or more cross-link interference (CLI) signals. The one or more CLI signals may comprise one or more uplink (UL) signals transmitted from one or more other UEs to a network node during one or more CLI opportunities. The one or more CLI opportunities may comprise measurement resources that coincide with UL transmissions corresponding to the one or more CLI signals. The method may also comprise determining one or more angles-of-arrival (AoA) of the one or more CLI signals based on measurements of the one or more CLI signals. The method may further comprise reporting the one or more AoAs of the one or more CLI signals to an anchor node.

Another exemplary user equipment (UE) is disclosed. The UE may comprise means for measuring one or more cross-link interference (CLI) signals. The one or more CLI signals may comprise one or more uplink (UL) signals transmitted from one or more other UEs to a network node during one or more CLI opportunities. The one or more CLI opportunities may comprise measurement resources that coincide with UL transmissions corresponding to the one or more CLI signals. The UE may also comprise means for determining one or more angles-of-arrival (AoA) of the one or more CLI signals based on measurements of the one or more CLI signals. The UE may further comprise means for reporting the one or more AoAs of the one or more CLI signals to an anchor node.

An exemplary non-transitory computer-readable medium storing computer-executable instructions for a user equipment (UE) is disclosed. The computer-executable instructions may comprise one or more instructions causing the UE to measure one or more cross-link interference (CLI) signals. The one or more CLI signals may comprise one or more uplink (UL) signals transmitted from one or more other UEs to a network node during one or more CLI opportunities. The one or more CLI opportunities may comprise measurement resources that coincide with UL transmissions corresponding to the one or more CLI signals. The computer-executable instructions may also comprise one or more instructions causing the UE to determine one or more angles-of-arrival (AoA) of the one or more CLI signals based on measurements of the one or more CLI signals. The computer-executable instructions may further comprise one or more instructions causing the UE to report the one or more AoAs of the one or more CLI signals to an anchor node.

An exemplary network node is disclosed. The network node may comprise a processor, a memory, and a transceiver. The processor may be coupled to the memory and the transceiver and may be configured to receive, from a user equipment (UE), a report of one or more angles-of-arrival (AoA) of one or more cross-link interference (CLI) signals at the UE. The one or more CLI signals may comprise one or more uplink (UL) signals transmitted from one or more other UEs to the network node during one or more CLI opportunities. The one or more CLI opportunities may comprise measurement resources that coincide with UL transmissions corresponding to the one or more CLI signals. The processor, the memory, and/or the transceiver may also be configured to refine a location of the UE based on the one or more AoAs or forward the one or more AoAs to an anchor node or both.

An exemplary method performed by a network node is disclosed. The method may comprise receiving, from a user equipment (UE), a report of one or more angles-of-arrival (AoA) of one or more cross-link interference (CLI) signals at the UE. The one or more CLI signals may comprise one or more uplink (UL) signals transmitted from one or more other UEs to the network node during one or more CLI opportunities. The one or more CLI opportunities may comprise measurement resources that coincide with UL transmissions corresponding to the one or more CLI signals. The method may also comprise refining a location of the UE based on the one or more AoAs or forwarding the one or more AoAs to an anchor node or both.

Another exemplary network node is disclosed. The UE may comprise means for receiving, from a user equipment (UE), a report of one or more angles-of-arrival (AoA) of one or more cross-link interference (CLI) signals at the UE. The one or more CLI signals may comprise one or more uplink (UL) signals transmitted from one or more other UEs to the network node during one or more CLI opportunities. The one or more CLI opportunities may comprise measurement resources that coincide with UL transmissions corresponding to the one or more CLI signals. The UE may also comprise means for refining a location of the UE based on the one or more AoAs or means for forwarding the one or more AoAs to an anchor node or both.

An exemplary non-transitory computer-readable medium storing computer-executable instructions for a network node is disclosed. The computer-executable instructions may comprise one or more instructions causing the network node to receive, from a user equipment (UE), a report of one or more angles-of-arrival (AoA) of one or more cross-link interference (CLI) signals at the UE. The one or more CLI signals may comprise one or more uplink (UL) signals transmitted from one or more other UEs to the network node during one or more CLI opportunities. The one or more CLI opportunities may comprise measurement resources that coincide with UL transmissions corresponding to the one or more CLI signals. The computer-executable instructions may also comprise one or more instructions causing the network node to refine a location of the UE based on the one or more AoAs or forward the one or more AoAs to an anchor node or both.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
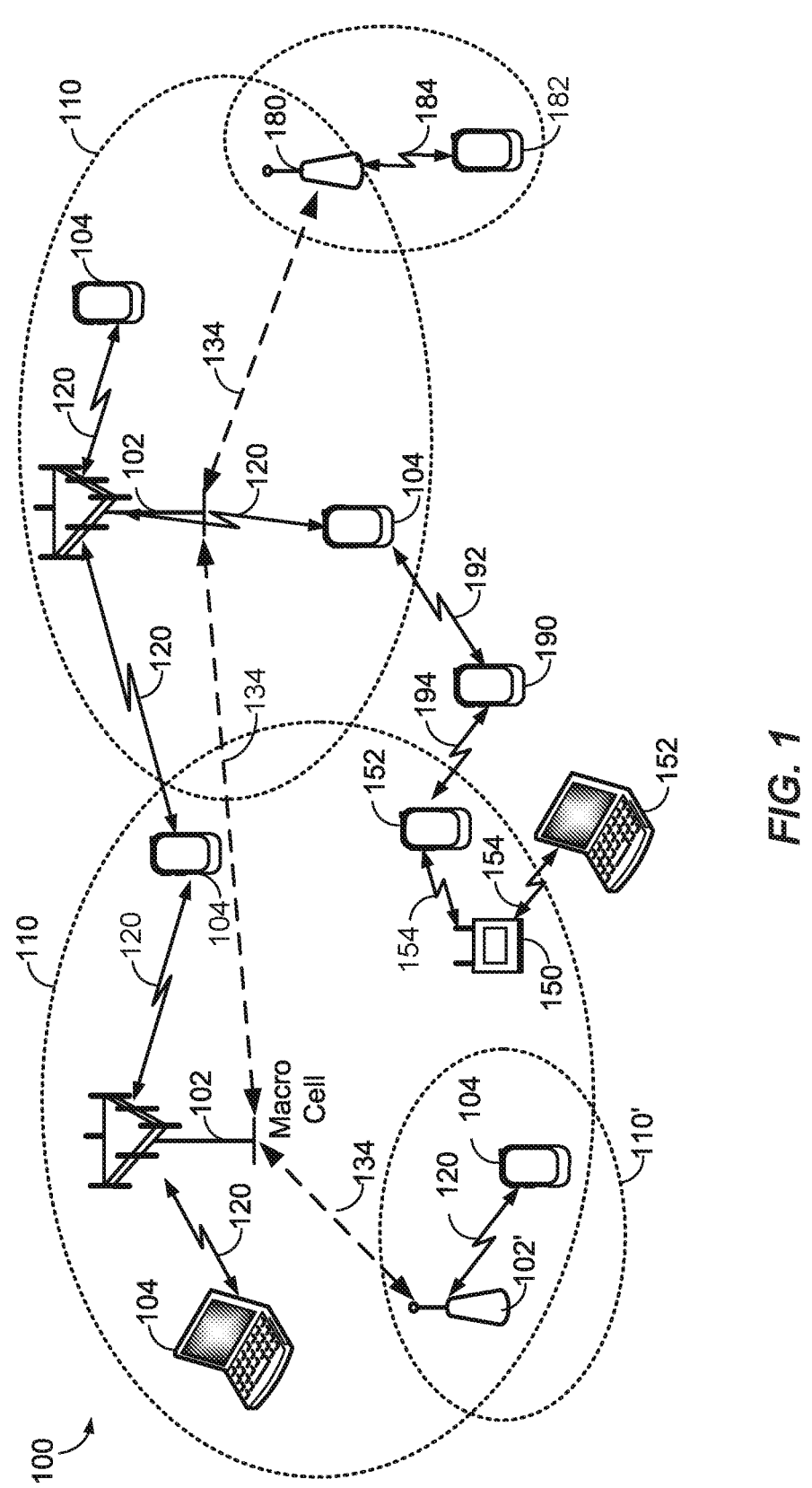
FIG. 1 illustrates an exemplary wireless communications system in accordance with an aspect of the disclosure.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, such UEs may be any wireless communication device (e.g., a mobile phone, router, tablet computer, laptop computer, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, Wireless Fidelity (WiFi) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates an exemplary wireless communications system 100. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to an LTE network, gNodeBs (gNBs) where the wireless communications system 100 corresponds to a 5G NR network, and/or a combination thereof, and the small cells may include femtocells, picocells, microcells, etc.

The base stations 102 may collectively form a RAN and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs) and/or Home gNBs (HgNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input multiple-output (MIMO) antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
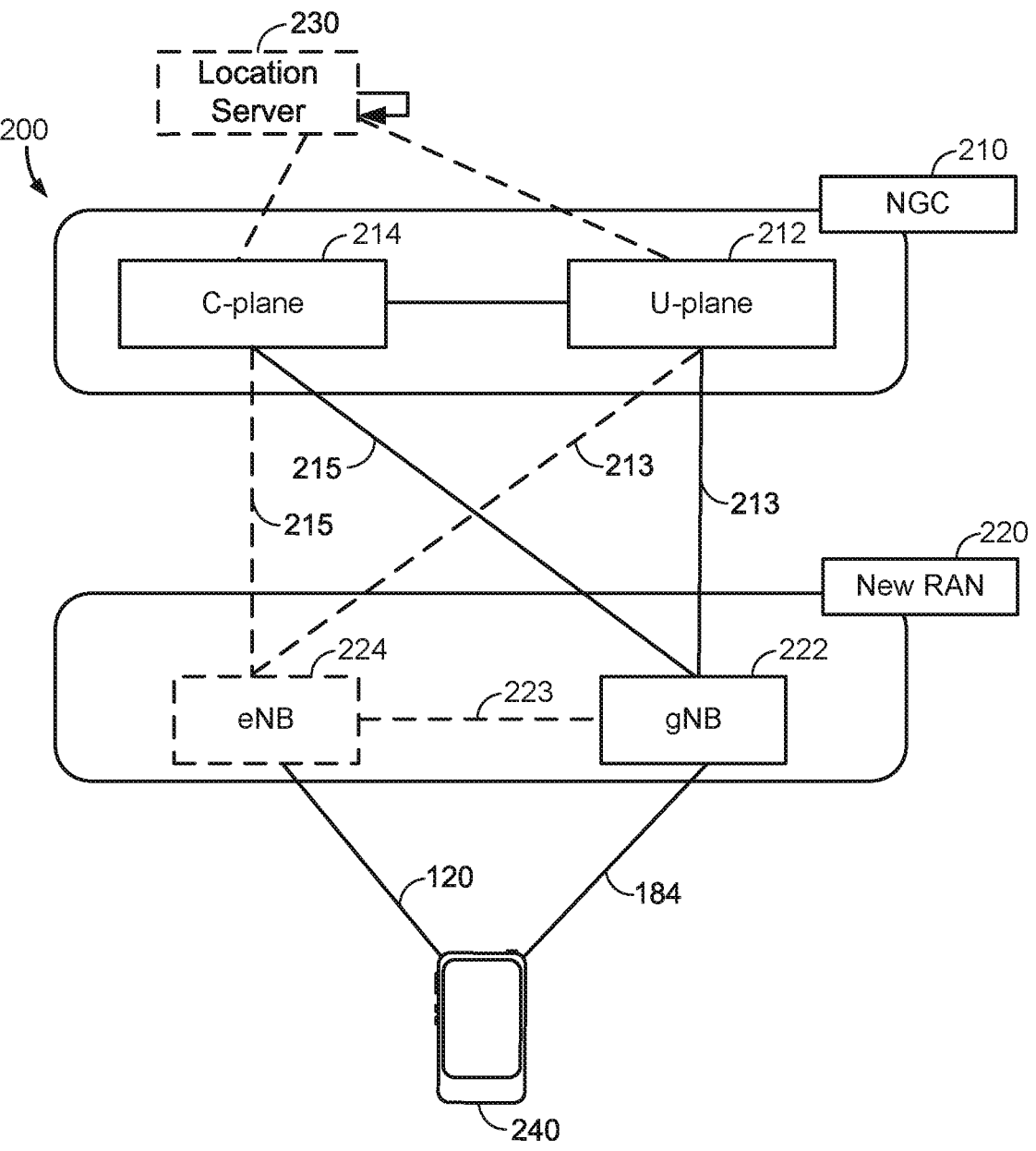
FIGS. 2A and 2B illustrate example wireless network structures in accordance with an aspect of the disclosure.

FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, internet protocol (IP) routing, etc.) which operate cooperatively to form the core network. User plane interface (NG-U) 213 and control plane interface (NG-C) 215 may connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.).

Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
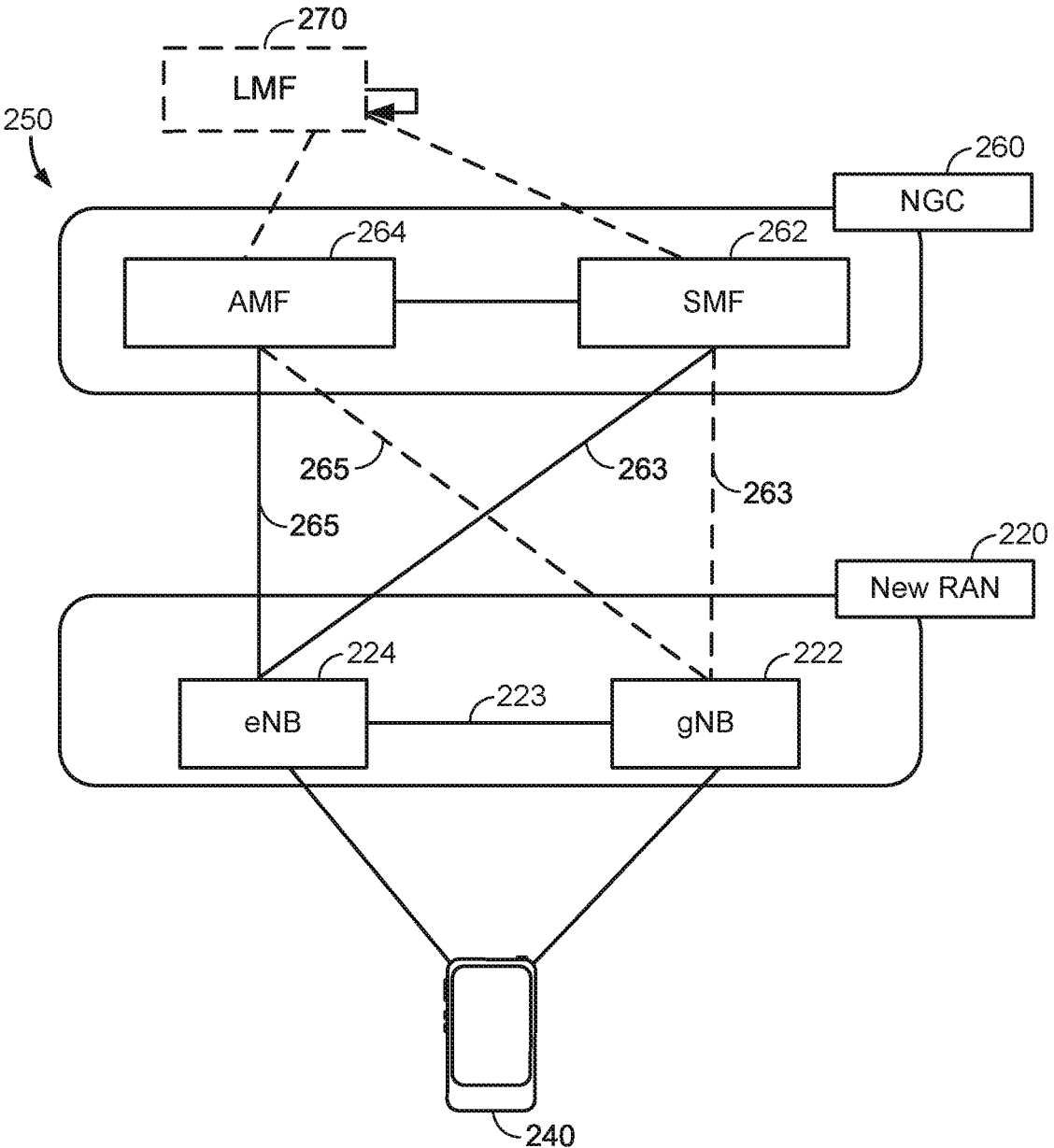

FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 may connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1, such as UEs 104, UE 182, UE 190, etc.).

Another optional aspect may include a location management function (LMF) 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
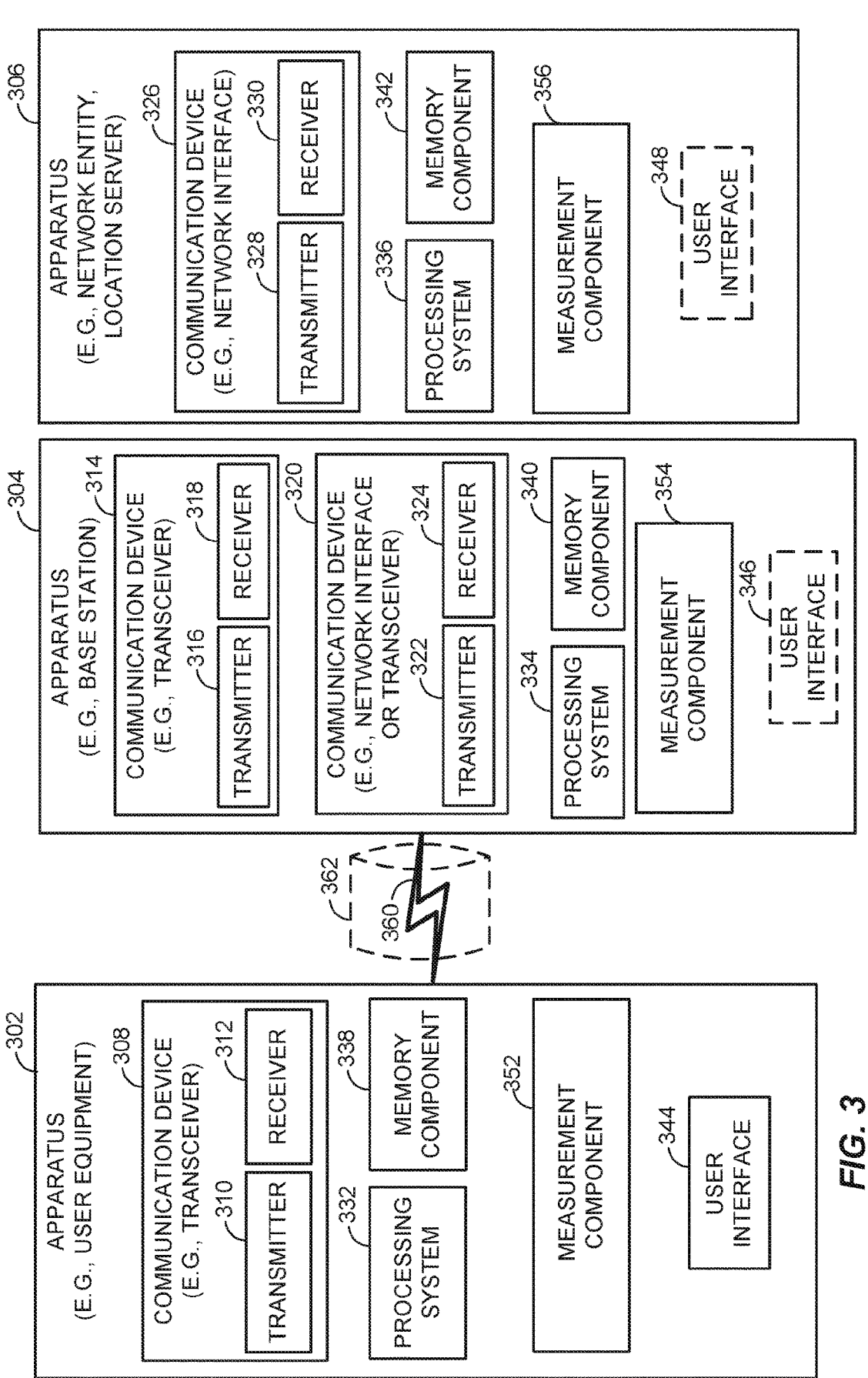
FIG. 3 is a simplified block diagram of several sample aspects of components that may be employed in wireless communication nodes and configured to support communication in accordance with an aspect of the disclosure.

FIG. 3 illustrates several sample components (represented by corresponding blocks) that may be incorporated into an apparatus 302, an apparatus 304, and an apparatus 306 (corresponding to, for example, a UE, a base station (e.g., a gNodeB), and a network entity or location server, respectively) to support the operations as disclosed herein. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 302 and the apparatus 304 may each include at least one wireless communication device (represented by communication devices 308 and 314) for communicating with other nodes via at least one designated RAT (e.g., LTE, 5G NR). Each communication device 308 may include at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Each communication device 314 may include at least one transmitter (represented by the transmitter 316) for transmitting signals (e.g., messages, indications, information, pilots, and so on) and at least one receiver (represented by the receiver 318) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 304 may also comprise a Network Listen Module (NLM) or the like for performing various measurements.

The apparatus 304 and the apparatus 306 include at least one communication device (represented by communication devices 320 and 326) for communicating with other nodes. For example, the communication device 326 may comprise a network interface (e.g., one or more network access ports) that is configured to communicate with one or more network entities via a wire-based or wireless backhaul connection. In some aspects, the communication device 326 may be implemented as a transceiver configured to support wire-based or wireless signal communication. This communication may involve, for example, sending and receiving messages, parameters, or other types of information. Accordingly, in the example of FIG. 3, the communication device 326 is shown as comprising a transmitter 328 and a receiver 330 (e.g., network access ports for transmitting and receiving). Similarly, the communication device 320 may comprise a network interface that is configured to communicate with one or more network entities via a wire-based or wireless backhaul. As with the communication device 326, the communication device 320 is shown as comprising a transmitter 322 and a receiver 324.

The apparatuses 302, 304, and 306 may include other components that can be used in conjunction with the operations as disclosed herein. The apparatus 302 may include a processing system 332 for providing functionality relating to, for example, operations in a licensed or unlicensed frequency band as disclosed herein and for providing other processing functionality. The apparatus 304 may include a processing system 334 for providing functionality relating to, for example, operations in a licensed or unlicensed frequency band as disclosed herein and for providing other processing functionality. The apparatus 306 may include a processing system 336 for providing functionality relating to, for example, operations in a licensed or unlicensed frequency band as disclosed herein and for providing other processing functionality. In an aspect, the processing systems 332, 334, and 336 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 may include memory components 338, 340, and 342 (e.g., each including a memory device), respectively, for maintaining information (e.g., information indicative of reserved resources, thresholds, parameters, and so on). In addition, the apparatuses 302, 304, and 306 may include user interface devices 344, 346, and 348, respectively, for providing indications (e.g., audible and/or visual indications) to a user and/or for receiving user input (e.g., upon user actuation of a sensing device such a keypad, a touch screen, a microphone, and so on).

For convenience, the apparatuses 302, 304, and/or 306 are shown in FIG. 3 as including various components that may be configured according to the various examples described herein. It will be appreciated, however, that the illustrated blocks may have different functionality in different designs.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented in blocks 308, 332, 338, and 344 may be implemented by processor and memory component(s) of the apparatus 302 (e.g., by execution of appropriate code and/or by appropriate configuration of processor components). Similarly, some or all of the functionality represented by blocks 314, 320, 334, 340, and 346 may be implemented by processor and memory component(s) of the apparatus 304 (e.g., by execution of appropriate code and/or by appropriate configuration of processor components). Also, some or all of the functionality represented by blocks 326, 336, 342, and 348 may be implemented by processor and memory component(s) of the apparatus 306 (e.g., by execution of appropriate code and/or by appropriate configuration of processor components).

In an aspect, the apparatus 304 may correspond to a "small cell" or a Home gNodeB, such as Home gNodeB 102' in FIG. 1. The apparatus 302 may transmit and receive messages via a wireless link 360 with the apparatus 304, the messages including information related to various types of communication (e.g., voice, data, multimedia services, associated control signaling, etc.). The wireless link 360 may operate over a communication medium of interest, shown by way of example in FIG. 3 as the medium 362, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 304 and the apparatus 302 for the medium 362.

As a particular example, the medium 362 may correspond to at least a portion of an unlicensed frequency band shared with another RAN and/or other APs and UEs. In general, the apparatus 302 and the apparatus 304 may operate via the wireless link 360 according to one or more radio access types, such as LTE, LTE-U, or 5G NR, depending on the network in which they are deployed. These networks may include, for example, different variants of CDMA networks (e.g., LTE networks, 5G NR networks, etc.), TDMA networks, FDMA networks, Orthogonal FDMA (OFDMA) networks, Single-Carrier FDMA (SC-FDMA) networks, and so on. Although different licensed frequency bands have been reserved for wireless communications (e.g., by a government entity such as the Federal Communications Commission (FCC) in the United States), certain communication networks, in particular those employing small cell base stations, have extended operation into unlicensed frequency bands, such as the Unlicensed National Information Infrastructure (U-NII) band used by WLAN technologies, most notably IEEE 802.11x WLAN technologies generally referred to as "Wi-Fi," and LTE in unlicensed spectrum technologies generally referred to as "LTE-U" or "MuLTE-Fire."

Apparatus 302 may also include a measurement component 352 that may be used to obtain location related measurements of signals (e.g., round trip time (RTT), angle-of-arrival (AoA), and/or other signals) transmitted by a base station or AP or by other UEs according to techniques described herein. Location related measurements may include measurements of signal propagation time or RTT between a UE and a base station, AP, and/or other UEs.

Apparatus 304 and 306 may each include measurement components 354 and 356, respectively, which may be used to determine a location estimate for a UE (e.g., apparatus 302), according to techniques described herein, based on location related measurements provided by the UE and/or by a base station or AP. Location related measurements obtained by the UE may include measurements of signal propagation time or RTT between a UE and a base station, AP, or other UEs or AoAs of signals transmitted from base station, AP, or other UEs. Location related measurements obtained by any of gNodeBs and/or eNodeBs (e.g., apparatus 304) may include measurements of signal propagation time or RTT between the UE and a base station or AP, and/or AoAs of signals transmitted from the UE, AP, etc.

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 4:
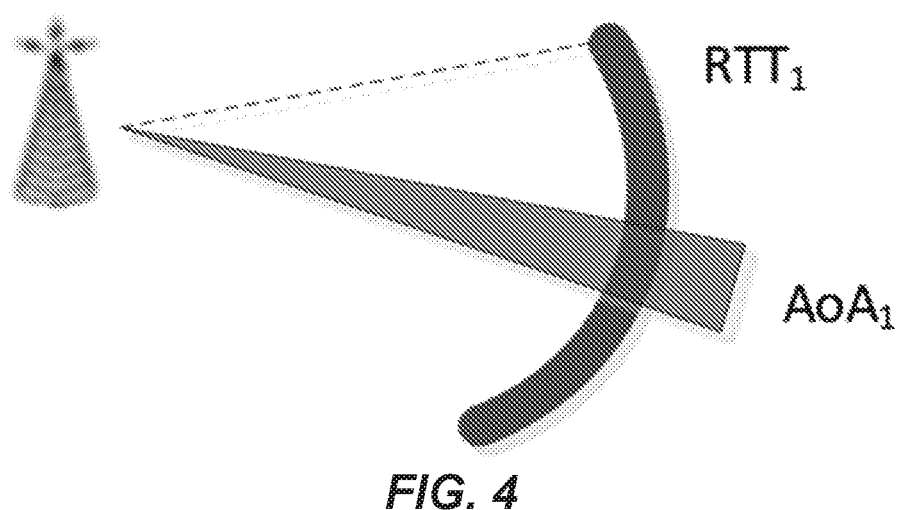
FIG. 4 illustrates a scenario for determining a position of a user equipment (UE) using a conventional uplink angle-of-arrival (AoA) technique.

FIG. 4 illustrate a scenario for determining a position of a UE using a conventional UL AoA based technique. In this conventional technique, a UE may transmit a UL signal to a base station (e.g., gNB). The base station may estimate the AoA of the UL signal from the UE using a direction antenna. The base station may also estimate the distance of the UE using round trip time (RTT) calculation. The UE's location may be estimated by combining the distance and AoA estimates. For example, the UE's location may be determined as the intersection of a hyperbola (representing distance estimation) and AoA. In three dimensions (3D), the UE's location may be determined as the intersection of a hyperboloid and the AoA. Note that the intersection may define a region (in 2D or 3D) due to measurement uncertainties.

Figure 5:
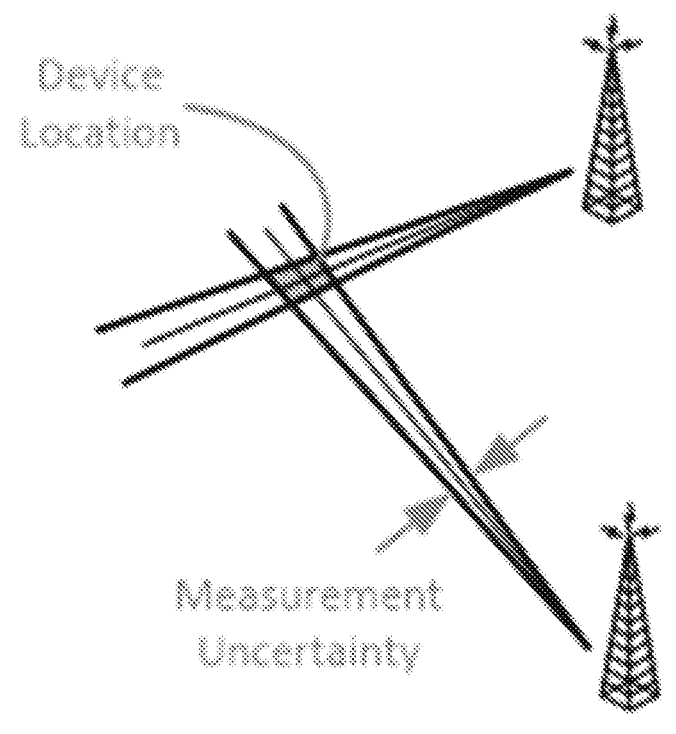
FIG. 5 illustrates a scenario for determining a position of a UE using another conventional uplink AoA technique.

FIG. 5 illustrates a scenario for determining a position of a UE using another conventional UL AoA based technique. In this alternative conventional technique, the UE may transmit the UL signal, but this time, multiple base stations may receive the UL signal. In this instance, each base station may estimate the AoA. The UE's location may be determined as the intersection of the multiple AoA measurements. Again, the intersection may define a region due to measurement uncertainties.

The AoA may be defined as angle or angles with respect to a reference direction or directions. In 2D, the AoA may be represented with one angle—azimuth-of-arrival angle $\phi$ (or simply azimuth $\phi$—with respect to the reference direction. In 3D, the AoA may be represented with two angles—azimuth $\phi$ and zenith-of-arrival angle $\theta$ (or simply zenith $\theta$)—with respect to a reference direction.

The reference direction(s) may be defined according to a global coordinate system (GCS) or a local coordinate system (LCS). In GCS, the reference directions may be defined as follows:

For azimuth, $\phi=0$ points to geographical north, positive in a counter-clockwise direction, and For zenith, $\theta=0$ points to zenith, $\theta=90°$ points to horizon.

In LCS, the reference directions may be defined as follows:

For azimuth, $\phi=0$ points to x-axis, positive in a counter-clockwise direction, and For zenith, $\theta=0$ points to z-axis, and $\theta=90°$ points to x-y plane. Translations between GCS and LCS uses a set of angles $(\alpha, \beta, \gamma)$ in which $\alpha$ is a bearing angle, $\beta$ is a downtilt angle, and $\gamma$ is a slant angle.

One way to improve the positioning accuracy is to provide complementary information. For example, the base station (e.g., gNB) may estimate the UE's location via the UL AoA techniques illustrated in FIGS. 4 and 5. But in addition, the UE may estimate its position among other UEs, and provide its estimated location to the base station. In this way, the accuracy of the UE's position estimation may be improved.

Thus, in one or more aspects, it is proposed to enable the UE to estimate AoAs of UL signals from one or more other UEs. In an aspect, the UL signals may be cross-link interference (CLI) signals. That is, the proposed technique for estimating or otherwise determining a UE's position among other UEs may be referred to as "CLI enabled AoA estimation".

Figure 6:
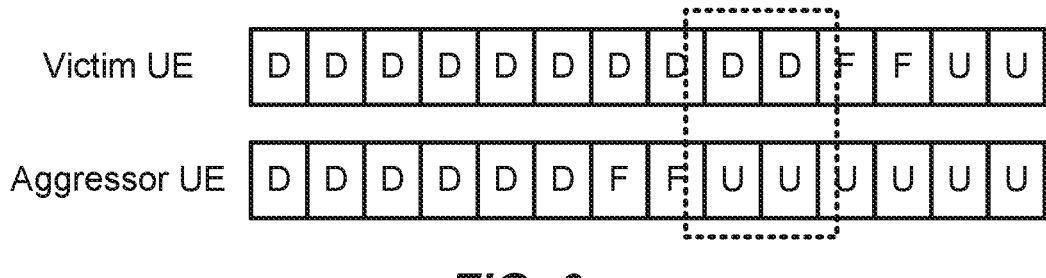
FIG. 6 illustrates an example of uplink-downlink symbol formats in a time-division duplex (TDD) environment of nearby UEs when cross-link interference (CLI) occurs.

So as to provide some context, CLI is briefly described. CLI is typically used within an interference environment among the UEs. In time division duplex (TDD) environment, nearby UEs have different UL-DL slot formats as illustrated in FIG. 6. As seen, a victim UE receives transmissions from an aggressor UE within a UL symbol (i.e., interfering symbol) of the aggressor which collides with a DL symbol of the victim. That is, when the aggressor UE makes the UL transmission, it can interfere with the DL reception in the victim UE. The UL transmissions causing the CLI may include transmissions on physical uplink control channel (PUCCH), physical uplink shared channel (PUSCH), physical random access channel (PRACH) preamble, sounding reference signal (SRS), etc.

Figure 7:
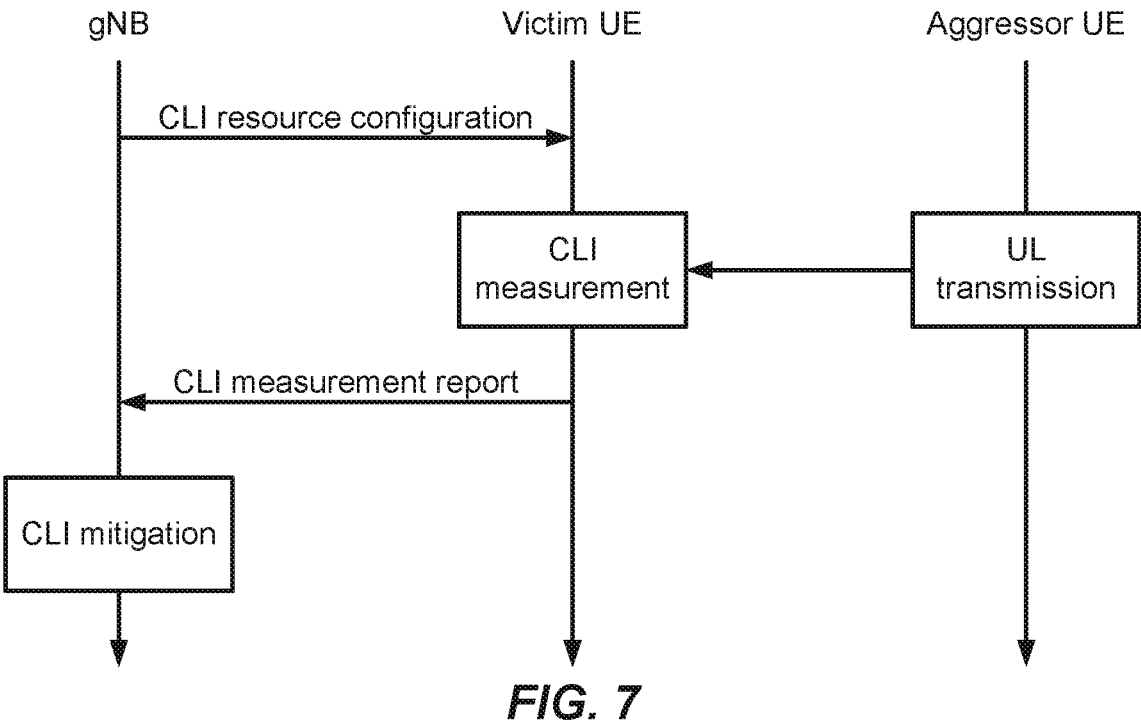
FIG. 7 illustrates an example flow for measuring and reporting CLI among a base station, a victim UE, and an aggressor UE.

In Release 16 (Rel. 16) standard of the Third Generation Partnership Project (3GPP), measurement and reporting of CLI is defined. As seen in FIG. 7, the network configures CLI resources for interference management. For example, victim UE may be configured with measurement resources (e.g., symbols, frequencies) that coincide with uplink transmissions scheduled for one or more aggressor UEs. Note that the scheduling for the aggressor UEs need not be adjusted in any special way. The victim UE may measure the UL transmissions of the aggressor UEs, and report the measurement to the network (e.g., base station). The network then may take steps to mitigate (e.g., eliminate or reduce) CLIs among the UE.

Figure 8:
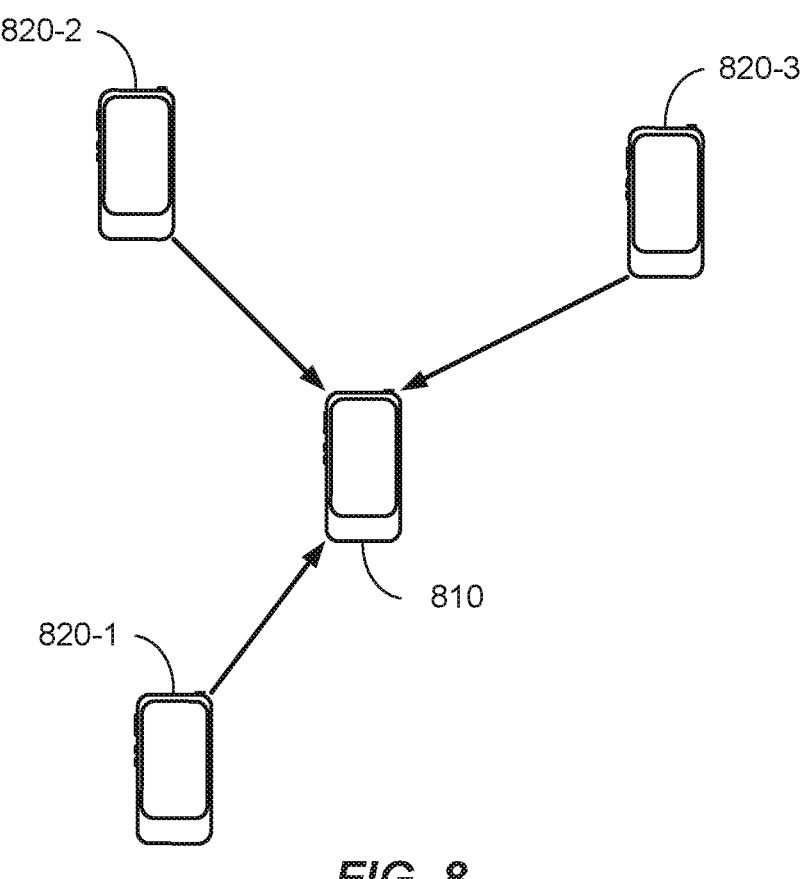
FIG. 8 illustrates an example scenario for a UE determining AoAs of signals transmitted from other UEs in accordance with an aspect of the disclosure.

In the proposed CLI enabled AoA estimation, a UE (e.g., the victim UE) may be enabled to take the CLI measurement opportunity to estimate the AoAs of the UL signals. For example, as illustrated in FIG. 8, a UE (e.g., victim UE 810) may estimate the AoAs of UL signals from one or more other UEs (e.g., aggressor UEs 820-1, 820-2, 820-3) during CLI opportunities. That is, during the CLI measurement opportunities, the UE 810 may measure the UL signals from the one or more other UEs 820-1, 820-2, 820-3 for estimating the AoAs in addition to or instead of for determining the CLIs due to the one or more other UEs. To measure the AoAs, the UE may be provided with multi-panel or multi-antenna capabilities.

The UE may report the AoAs of the one or more other UEs to the network (e.g., to the base station, location server, LMF, etc.). Alternatively or in addition thereto, the UE may determine its location based on the AoAs, and may report the determined location to the network. The network may utilize the reported information to refine its determination of the UE's location.

The following is a list of benefits of CLI based AoA estimation (not necessarily exhaustive).

Angle information among UEs may be used to position UE, with limited UE Uu (interface between UE and base station (e.g., gNB)) resource cost.

Angle information may be used as complementary information to improve positioning accuracy.

CLI would most likely occur among adjacent UE, in which line-of-sight (LOS) propagation is the norm. LOS propagation enables more accurate location estimation.

In an aspect, the UE may be configured to estimate the AoAs within the context of a coordinate system. In a first option, the UE may be configured estimate the AoAs based on the GCS. In a second option, the UE may be configured to estimate the AoAs based on the LCS. In this option, in addition to the estimated AoAs, the associated pose information $(\alpha, \beta, \gamma)$ may also be combined.

Note that first and second options are comparable to the coordinate systems used by the base stations in estimating the UE position as described above with reference to FIGS. 4 and 5. As indicated, GCS and LCS are coordinate systems to represent the relative estimated angle. For example, in GCS, an estimated AoA may have two components ($\phi=90$, $\theta=70$) meaning that signal is estimated to be from an aggressor UE that is due west and above the victim UE. In LCS, the representation may also be ($\phi$, $\theta$) in its local coordinate system with specific pose information ($\alpha$, $\beta$, $\gamma$).

Whether the coordinate system is GCS or LCS, the build of the system can take significant amount of resources. Thus, it is normally the case that the device is static so as to maintain stable calibration. Typically, the calibration may be for a base station (e.g., eNB, gNB, etc.) calibration. For example, a base station is usually fixed such that its position and pose are static. When there is any variation, the BS may rebuild the coordinate system.

On the UE side, estimating the AoAs based on the GCS or LCS coordinate system may be satisfactory for UE's that are relatively static. For examples, UEs such as customer provided equipments (CPEs) (e.g., telephones, routers, network switches, set-top boxes, etc.), laptops, phones on desks, the first and second coordinate system options may work well. Typically, locations and orientations of these types of UEs are not expected to change frequently. Thus, the few recalibrations of the coordinate systems that take place when their position and/or pose do change may represent minimal cost.

However, for very mobile UEs such as smart phones, the GCS and LCS based AoA determination will very likely be impractical. Since mobile UEs are not static targets, their position and pose will be calibrated very frequently. For example, even when a phone is moved from left to right hand of the user, its reference receive (Rx) direction would be invalidated, and thus requiring a recalibration. Frequent recalibrations would take a significant toll on the UE's power and computational resources.

Thus, in a third option, a UE may be configured to estimate the AoAs within a context of a reference data direction. In this third option, the estimated AoA may be relative to the reference data direction. It is thus recognized that the accuracy of the estimated AoA would depend on the accuracy of the reference data direction.

Figure 9:
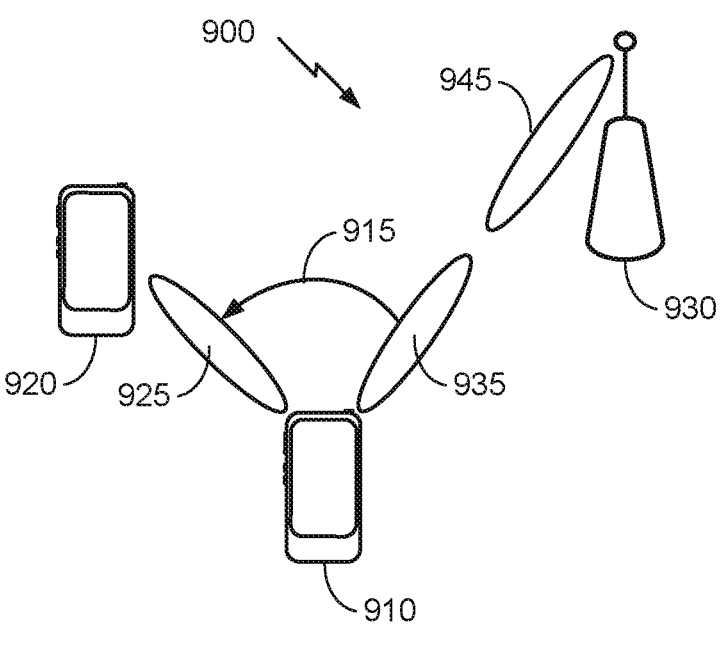
FIG. 9 illustrates an example scenario for determining AoA based on a coordinate system comprising a reference data direction in accordance with an aspect of the disclosure.

FIG. 9 illustrates a scenario 900 in which the AoA may be estimated based on a reference data direction. FIG. 9 includes first and second UEs 910, 920 and a base station 930. In this scenario, the direction of the downlink Rx beam 945 from the base station 930 to the first UE 910 may be taken to represent the reference data direction. Alternatively or in addition thereto, the direction of the uplink Tx beam 935 from the first UE 910 to the base station 930 may be taken to represent the reference data direction. Note that the beams 935 and 945 and their directions correspond to each other. The first UE 910 may estimate the AoA 915 of a CLI beam 925 transmitted from the second UE 920. The AoA 915 may be the relative angular difference between the Rx beam 935 and the CLI beam 925.

Note that the CLI beam 925 may be a UL signal transmitted by the second UE 920 intended for the base station 930 that arrives also at the first UE 910. Also note that the CLI signal 925 from the second UE 920 to the first UE 910 may take multiple paths. Thus, in one aspect, the first UE 910 may take the direction of the first CLI beam 925 as the AoA estimate. In another aspect, the first UE 910 may take the direction of the strongest CLI beam 925 as the AoA estimate.

In general, the reference data direction may be a direction of a specific beam between the UE and the base station (e.g. gNB) or a direction of a Uu channel between the UE and the base station. The UE only needs to measure the difference of the CLI signal from the Uu channel direction. For example, the UE may measure the CLI angle (i.e., the AoA) as a difference compared to SRS Tx direction (e.g., direction of beam 935). Alternatively or in addition thereto, the UE may measure the CLI angle (i.e., the AoA) as a difference compared to physical data shared channel (PDSCH) Rx direction (e.g., direction represented by beam 945). The AoA information may comprise two parts: relative direction, and the reference data direction.

The third option of estimating the AoA based on the reference data direction is beneficial or otherwise technically advantageous in that it reduces or even eliminates the need for recalibration of the coordinate system. This is because even when the orientation of the first UE 910 changes, the relative difference between the reference data direction (directions of beams 935, 945) and the CLI direction will remain relatively static.

Figure 10:
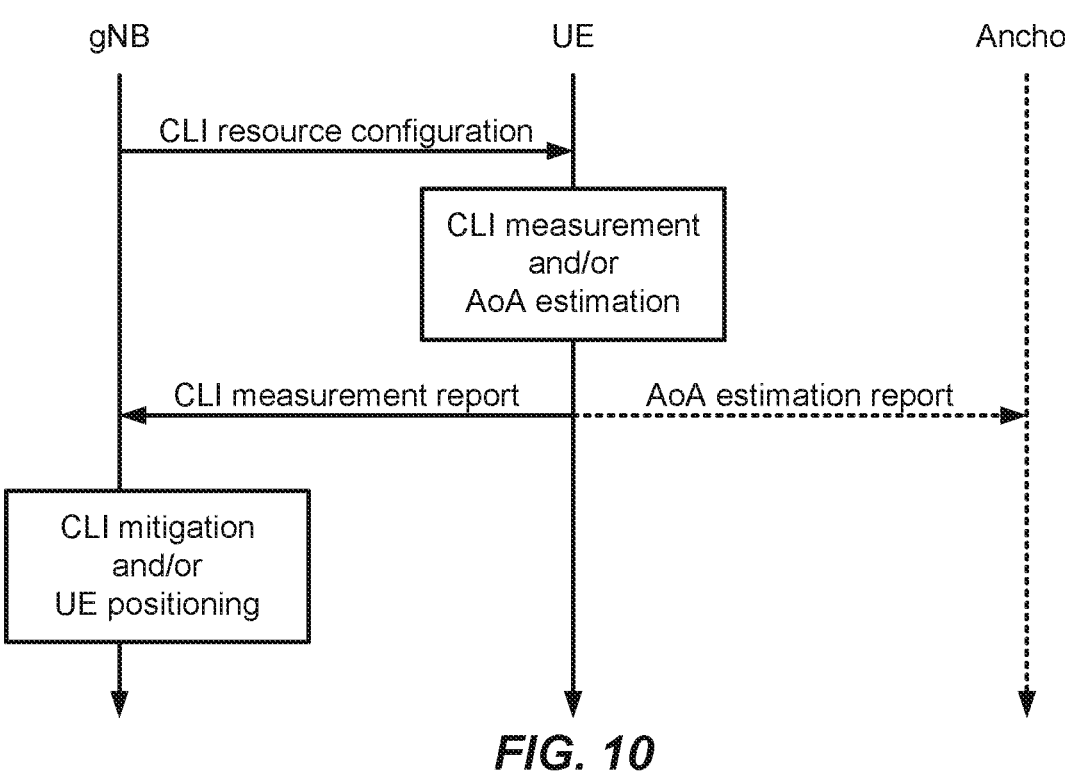
FIG. 10 illustrates an example flow for CLI AoA estimation and feedback procedure in accordance with an aspect of the disclosure.

FIG. 10 illustrates an example flow of a procedure for CLI based AoA estimation and feedback. The AoA estimation may be performed instead of or in addition to making the CLI measurements. In FIG. 10, the procedure in which AoA estimation is performed in addition to making CLI measurements is illustrated. The AoAs estimated by a UE may be used as complementary information for estimating the UE's location.

As seen, a gNB (more generally, a base station) may configure a UE (e.g., victim UE) with CLI opportunities. That is, the UE may be configured with measurement resources (e.g., symbols, frequencies) for the UE to measure CLIs due to transmissions of UL signals from one or more other UEs (e.g., aggressor UEs, not shown). For example, the measurement resources configured in the UE may coincide with UL transmissions scheduled for the one more other UEs. During these CLI opportunities, the UE may measure the UL transmissions (e.g., PUCCH, PUSCH, PRACH preamble, SRS transmissions, etc.) from the other UEs to determine the CLI.

For ease of reference, the UL signals transmitted from the one or more other UEs during the CLI opportunities may be referred to as CLI signals. That is, the UE (e.g., the victim UE) may be configured to measure one or more CLI signals. The one or more CLI signals may comprise one or more UL signals transmitted from the one or more other UEs (e.g., aggressor UEs) to the network node (e.g., gNB) during the one or more CLI opportunities.

In addition, the UE may also estimate the corresponding one or more AoAs of the UL transmissions. That is, the UE may estimate or otherwise determine the one or more AoAs of the CLI signals based on the measurements of the CLI signals. Since the other UEs are likely to be nearby UEs, LOS propagations are likely to be measured, which is technically advantageous. The AoAs of the signals from other UEs may be measured in the UE's coordinate system. The coordinate systems may be any of the three options described above (GCS, LCS, and/or reference data direction based).

The UE may report or otherwise provide feedback of the CLI measurements to the gNB. The gNB may take steps to mitigate CLI. The gNB may also estimate the UE's position, e.g., through the conventional UL AoA technique(s) described with reference to FIGS. 4 and/or 5.

The UE may also report or otherwise provide feedback of the AoA estimations of the CLI signals to any number of anchors. For example, the gNB may be an anchor. In this instance, the gNB may refine its estimation of the UE's position based on the AoA estimations from the victim UE. Alternatively or in addition thereto, any of the other UEs (i.e., any aggressor UE) may be an anchor. For example, if sidelink capabilities are enabled for the UE and the other UEs, the AoA estimation may be shared. This implies that there can be multiple anchors. There can also be no anchors.

In this instance, the UE may not share the AoA information with any other entity. Rather, it may save the information locally, e.g., for later use.

Figure 11:
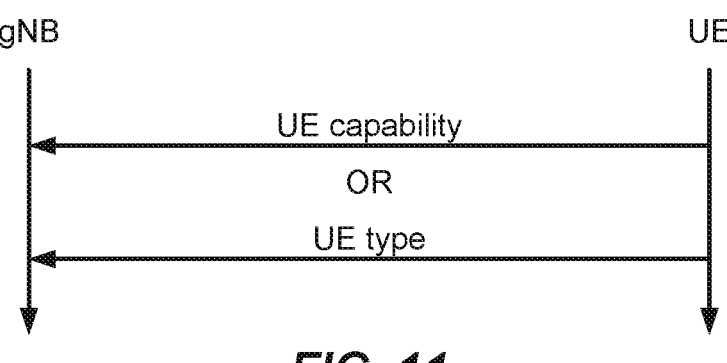
FIG. 11 illustrates an example flow for informing a network regarding a UE's coordinate system capability in accordance with an aspect of the disclosure.

As discussed above, the AoA estimation should be based on a coordinate system. Thus, selection of the coordinate system to use can be important. A UE may support one or more coordinate system types, and it may be desirable for the network to know the supported types. FIG. 11 illustrates an example flow for informing the network regarding the UE's coordinate system capability.

In an aspect, the UE may report its coordinate system capability to the gNB, e.g., in an information element (IE) as seen in FIG. 11. The IE may indicate (1) whether the UE can support angle calibration on a coordinate system, and (2) which coordinate system that the UE supports. The supported coordinate systems can be any one or more of the three options— GCS, LCS, reference data direction coordinate system (RDDCS).

As an illustration, assume that "0" indicates GCS support, "1" indicates LCS support, and "2" indicates RDDCS support. Then for a laptop UE, support for all types may be indicated, i.e., {0, 1, 2}. On the other hand, for a mobile phone UE, support only for the RDDCS may be indicated, i.e., {2}. An example IE may be defined as follows:

```
UECapability Information :: = SEQUENCE {
        CoordinateSystemEnable        INTEGER {0, 1},
        CoordinateSystemOptions       ENUMERATED {0, 1, 2}
    }
```

Alternatively, such information may be embedded into the UE type, and the UE may simply report its type (e.g., static, mobile, low-tier, etc.) to the gNB as seen in FIG. 11. For static UEs such as CPEs, the gNB may associate their support capability as {0, 1}. For mobile UEs such as smart phones, the gNB may associate their support capability as {2}. For low-tier UEs, the network may recognized that such UE do not support angle calibration on any coordinate system (e.g., associate support capability as { }).

Figure 12:
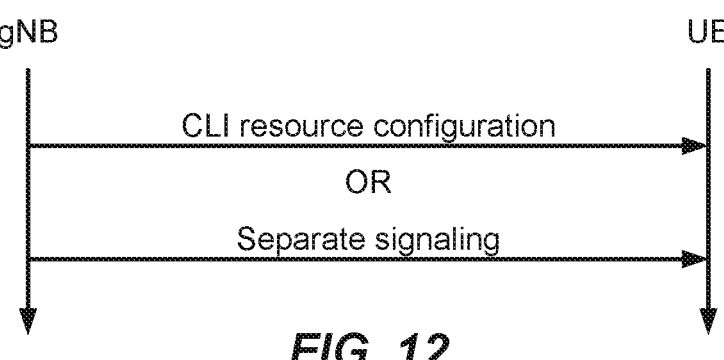
FIG. 12 illustrates an example flow for configuring a coordinate system in a UE in accordance with an aspect of the disclosure.

Based on the supported coordinate system or systems, the network may configure the UE with the coordinate system to estimate the AoAs. FIG. 12 illustrates an example flow for configuring a coordinate system in a UE. As seen, in one alternative, the corresponding configuration may be included as a part of the CLI resource configuration in a radio resource control (RRC) signaling. Also as seen, in another alternative, the corresponding configuration may be included in a separate signaling, e.g., in a downlink control information (DCI), medium access control (MAC) control element (CE), separate RRC signaling, etc.

The content of the corresponding configuration for the AoA estimation may include the following:

An indication of the coordinate system to be used for the angle estimation;

Format of the estimated and reported angle information:

Option 1: one relative angle, corresponding coordinate system;

Option 2: positive angle information;

Scheduling information of the report:

When to report;

Density in the time domain.

After any movement, it may be desirable for the UE to track its coordinate system. The UE may rebuild or update its coordinate system through a calibration procedure to enhance accuracy of the AoA estimation. In an aspect, the network may trigger the UE to rebuild/update its coordinate system. Alternatively or in addition thereto, the UE on its own may trigger the rebuild/update of its coordinate system. That is, the coordinate system rebuild/update trigger may be network-based and/or UE-based.

Figure 13A:
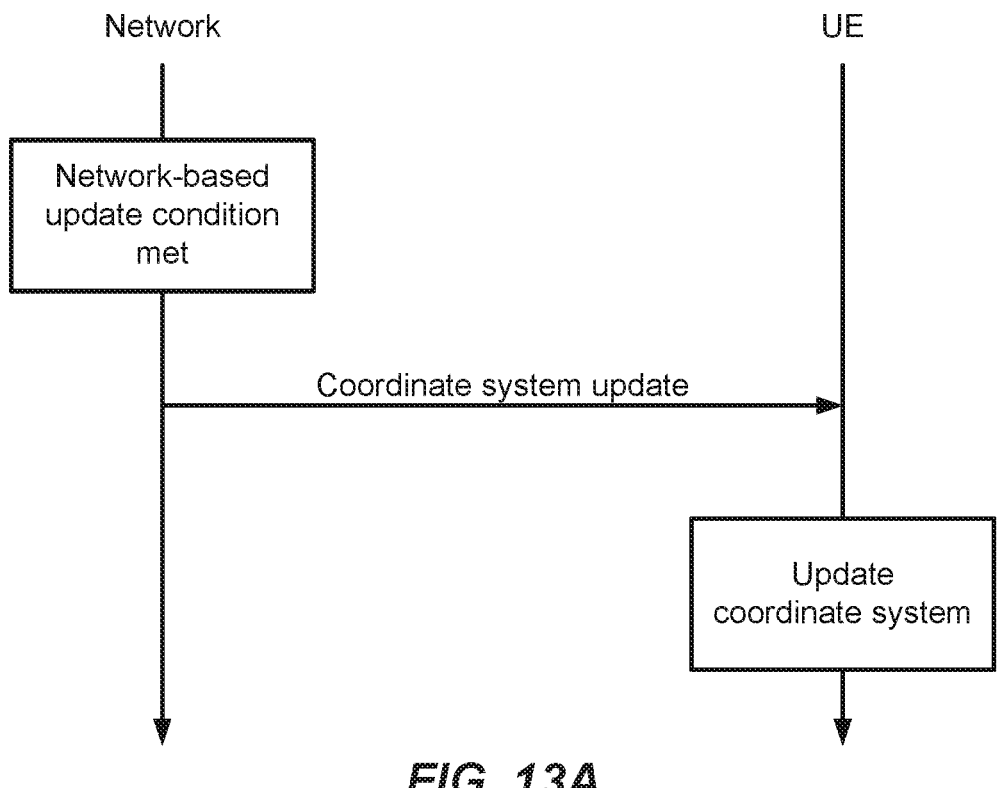
FIG. 13A illustrates an example flow for a network-based triggering of a coordinate system update in accordance with an aspect of the disclosure.

FIG. 13A illustrates an example flow for a network-based triggering of the coordinate system update. In the network-based triggering, the network (e.g., location server, base station, LMF, etc.) may determine whether or not a network-based update condition is met. If the network-based update condition is met, the network, e.g., through the gNB, may send a coordinate system update signal to the UE. The signaling may be through RRC, MAC-CE, and/or DCI. The UE in turn may update its coordinate system.

There may be various ways for the network to determine whether the network-based update condition is met. In a first way, the network-based update condition may be met when an UpdateDurationThreshold, e.g., 10 seconds, has passed since the last coordinate system update. In a second way, a network entity (e.g., gNB, location server, LMF) may measure the UE's speed and/or location. If the UE's speed and/or location change exceeds a SpeedLocationDeltaThreshold since the last coordinate system update, the network-based update condition may be met. In a third way, a network entity may measure Uu Tx/Rx direction change between the UE and the network node. If the change exceeds a UuDirectionDeltaThreshold, the network-based update condition may be met. In a fourth way, the network-based update condition may be met by each AoA estimation event. That is, for each AoA estimation event duration, the update may be triggered. In a fifth way, the network-based update condition may be met whenever the CLI resources are newly configured.

Figure 13B:
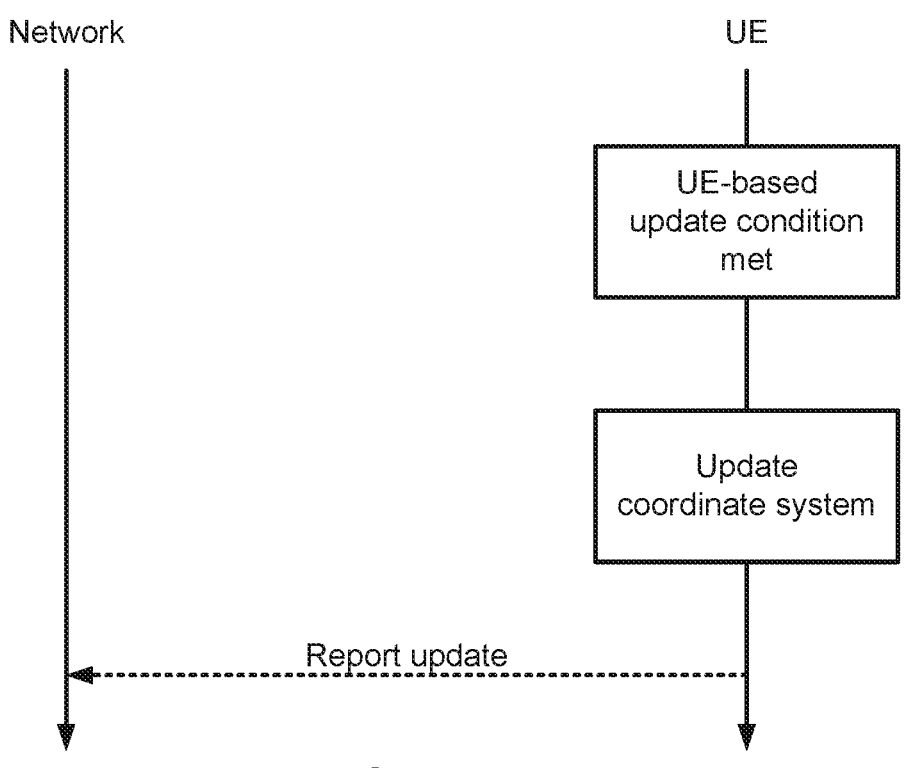
FIG. 13B illustrates an example flow for a UE-based triggering of a coordinate system update in accordance with an aspect of the disclosure.

FIG. 13B illustrates an example flow for a UE-based triggering of the coordinate system update. In the UE-based triggering, the UE may determine whether or not a UE-based update condition is met for the UE. If the UE-based update condition is met, the UE may update its coordinate system. Optionally, after the update, the UE may notify the network (e.g., to the gNB) of the coordinate system update.

There may be various ways for the UE to determine whether or not the UE-based update condition is met. In an aspect, the UE may make such determinations based on its sensors. In a first way, the UE may determine its location change (e.g., through global positioning system (GPS) sensor). If the change exceeds a LocationDeltaThreshold since the last coordinate system update, the UE-based update condition may be met. In a second way, if a change of the strength and/or quality of the signal from the gNB exceeds a StrengthQualityDeltaThreshold since the last coordinate system update, the UE-based update condition may be met. In a third way, the UE-based update condition may be met by each AoA estimation event. In a fourth way, the UE-based update condition may be met whenever the CLI resources are newly configured.

Figure 14A:
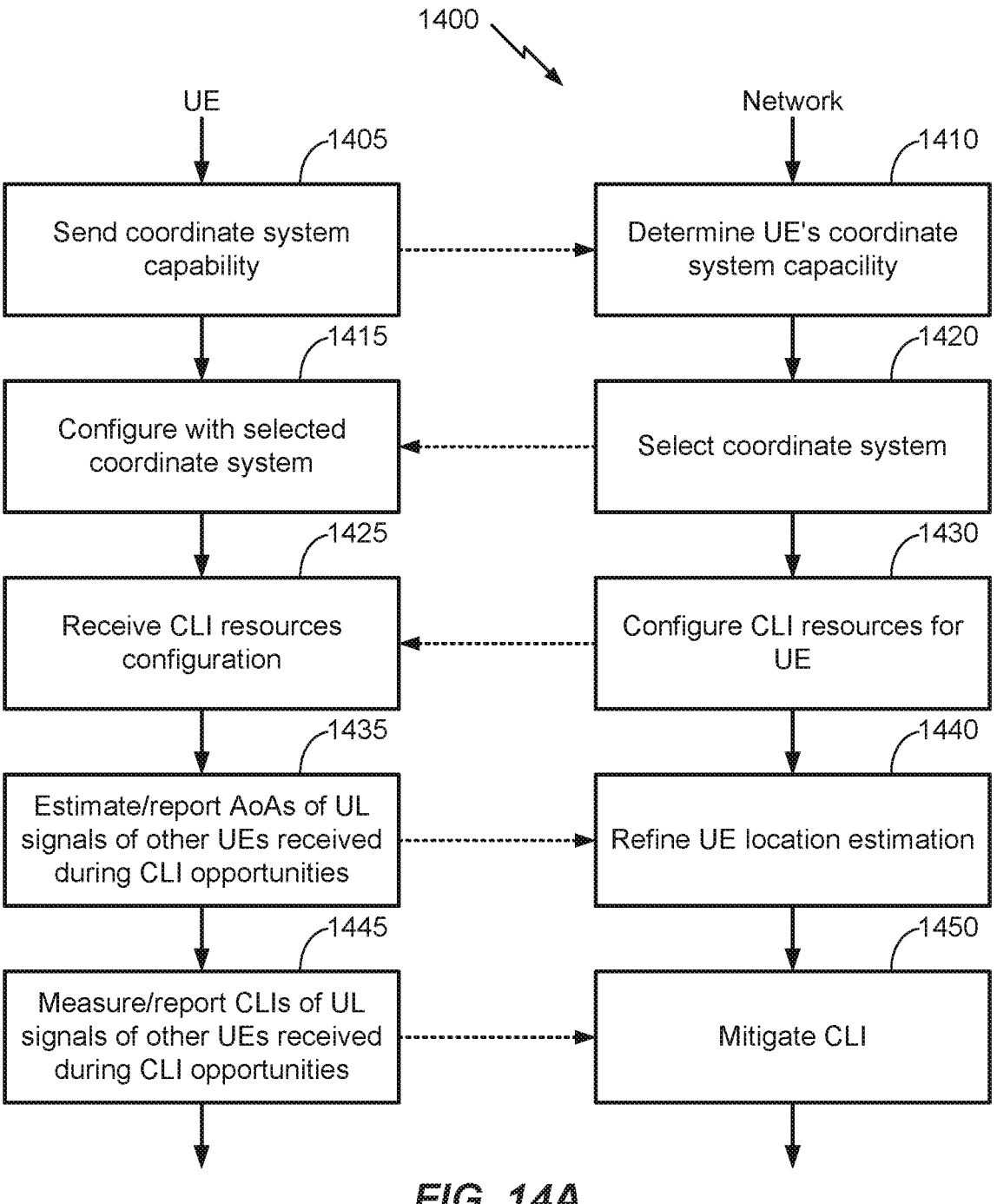
FIGS. 14A-14C illustrate an exemplary method performed by a UE and a base station for CLI enabled AoA estimation.
Figure 14B:
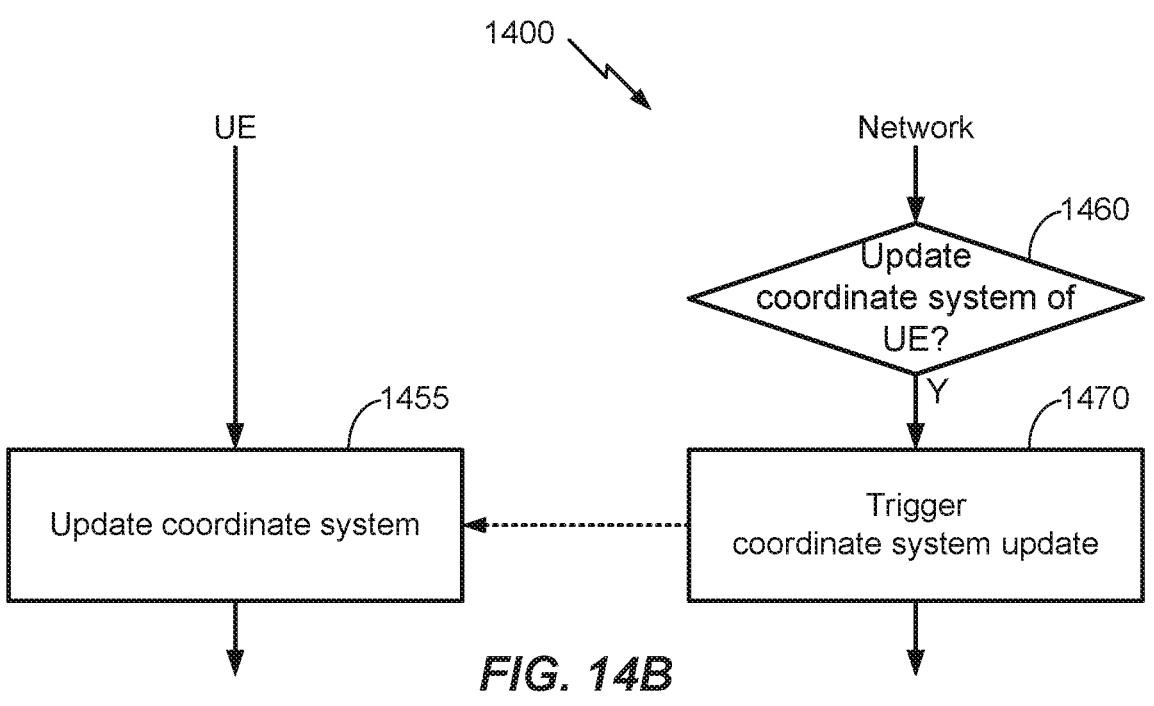
Figure 14C:
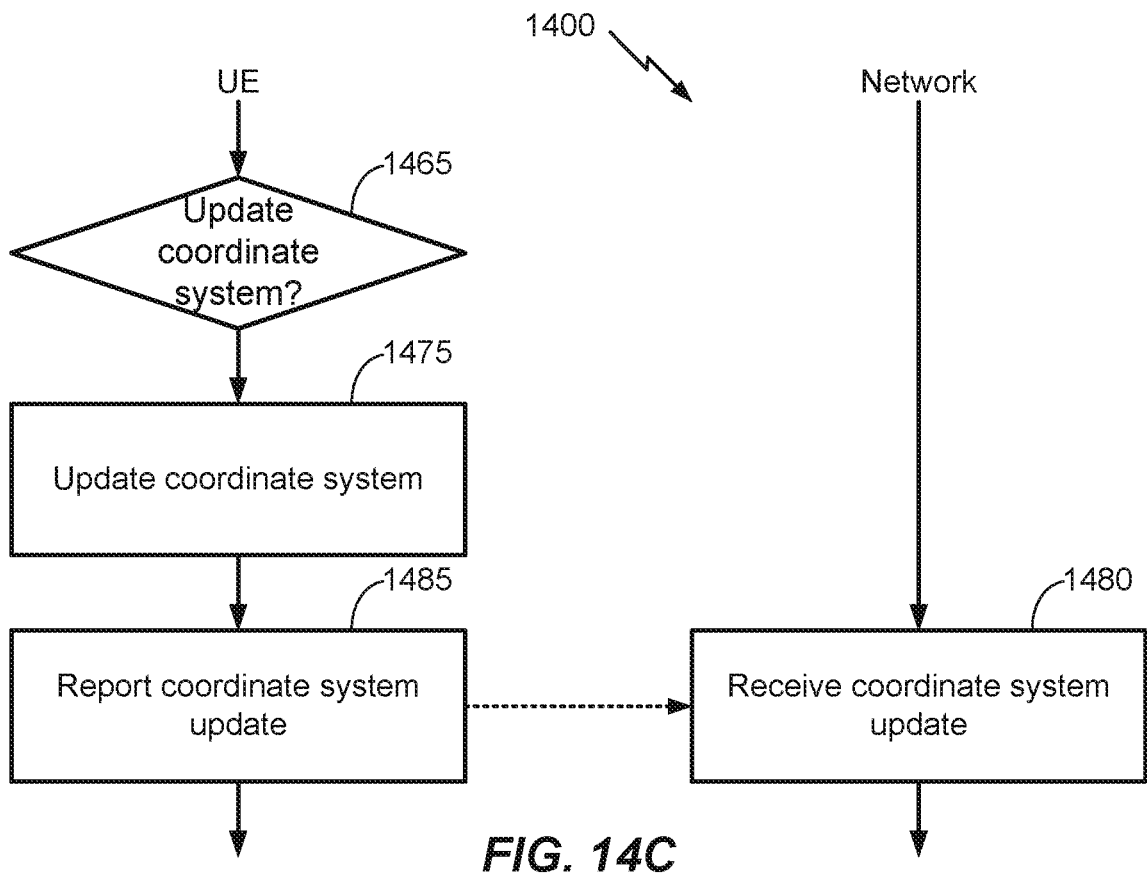

FIGS. 14A, 14B, 14C illustrate exemplary methods 1400 performed by a UE and a network node (e.g., gNB, location server, LMF, etc.) to enable CLI-based AoA estimation at the UE. In these figures, the dashed arrows indicate directions of communications between the UE and the network. In particular, FIG. 14A illustrates a flow chart of CLI-enabled AoA estimation and FIGS. 14B, 14C illustrate flow charts of updating coordinate system of the UE for AoA estimation.

In block 1405, the UE may send its coordinate system capability to the network node. For example, the UE may report its coordinate system capability in an IE (e.g., UECapabilityInformation IE). Alternatively or in addition thereto, the UE may report the UE type (e.g., static, mobile, low-tier, etc.).

In block 1410, the network node may determine the UE's coordinate system capability based on the IE and/or the UE type.

In block 1420, the network node may select the coordinate system for the AoA estimation based on the coordinate system or systems supported by the UE. The selection may be provided to the UE in an RRC signaling.

In block 1415, the UE may configure itself with the selected coordinate system (e.g., GCS, LCS, RDDCS).

In block 1430, the network node may configure CLI resources of the UE. The configuration may be provided in an RRC signaling. In one aspect, one RRC signaling occasion may be used to indicate both the selection of the coordinate system and the CLI resources configuration. That is, one RRC signaling may be used for blocks 1420 and 1430. Alternatively, they may be separate RRC signaling. As a further alternative, the CLI resources may be configured through DCI and/or MAC-CE signaling.

In block 1425, the UE may receive the CLI resources configuration. The CLI resources configuration may specify resources (e.g., symbols, frequencies) scheduled for the UE to measure one or more UL signals from corresponding one or more other UEs (e.g., aggressor UEs). That is, the CLI resources configuration may define or otherwise specify the CLI opportunities in which the one or more CLI signals may be measured.

In block 1435, the UE may estimate the AoAs of the one or more UL signals from the corresponding one or more other UEs received during the CLI opportunities and report the estimated AoAs to the network node. That is, the AoAs of the CLI signals may be measured and reported. For example, if the selected coordinate system is GCS, the UE may report the azimuth φ and zenith θ angles of each UL signal. In other words, for the AoAs of the one or more CLI signals that are reported, the UE may report each AoA as a combination the azimuth φ and zenith θ angles.

If the selected coordinate system is LCS, the UE may report azimuth φ and zenith θ angles of each UL signal along with the pose information ($\alpha$, $\beta$, $\gamma$). That is, for the AoAs of the one or more CLI signals that are reported, the UE may report each AoA as a combination the azimuth φ and zenith θ angles. Note that the pose information need not accompany AoA report of each UL signal. It may be sufficient to provide the pose information once during the report and report the AoAs of the one or more UL signals.

If the selected coordinate system is based on RDDCS, the UE may report each AoA as a relative different angle and a reference data direction. That is, for the AoAs of the one or more CLI signals that are reported, the UE may report each AoA as an angle relative to the reference data direction. In an aspect, the reference data direction may be the direction of an downlink Rx beam from the network node to the UE and/or the direction of an uplink Tx beam from the UE to the network node. Note that the reference data direction need not accompany the AoA estimation of each UL signal. It may be sufficient to provide the reference data direction once during the report and report the relative AoAs of the one or more UL signals.

In block 1440, the network node may refine the location estimation of the UE based on the estimated AoAs received from the UE. For example, a gNB may have estimated the UE's location, e.g., based on the techniques described with respect to FIGS. 4 and 5. But in block 1440, the received AoA estimations may be used to increase the accuracy of the UE's location determination.

In block 1445, the UE may also measure the CLIs of the UL signals from the corresponding one or more other UEs received during the CLI opportunities and report the measured CLIs to the network node.

In block 1450, the network node may take actions to mitigate—i.e., reduce or eliminate—CLIs based on the received CLI measurements.

FIG. 14B illustrates a flow chart of a network-based coordinate system update triggering. In block 1460, the network node may determine whether the UE's coordinate system should be updated, i.e., the network node may determine whether the network-based update condition is met. As discussed above, there can be various ways of making such determination (e.g., passage of UpdateDurationThreshold, UE's speed/location change exceeds SpeedLocationDeltaThreshold, UE's Uu direction change exceeds UuDirectionDeltaThreshold, occurrence of an AoA estimation event, new CLI configuration, etc.).

If it is determined that the network-based update condition is met, then in block 1470, the network node may trigger the coordinate system update. For example, the network node may send a coordinate system update signal to the UE.

In block 1455, the UE may update its coordinate system in response to the coordinate system update signal. For example, if the selected coordinate system is GCS, the UE may calibrate the true north (e.g., the true north (φ=0) and true zenith (θ=0). If the selected coordinate system is LCS, the UE may calibrate its pose information (α, β, γ). If the selected coordinate system is RDDCS based, the UE may calibrate the reference data direction (e.g., select same or different signal and determine reference data direction of the selected signal).

FIG. 14C illustrates a flow chart of a UE-based coordinate system update triggering. In block 1465, the UE may determine whether its coordinate system should be updated, i.e., the UE may determine whether the UE-based update condition is met. As discussed above, there can be various ways of making such determination (e.g., UE's location and/or speed exceed LocationDeltaThreshold, if signal from network node changes more than StrengthQualityDeltaThreshold, occurrence of an AoA estimation event, new CLI configuration, etc.).

If it is determined that the UE-based update condition is met, then in block 1475, the UE may update its coordinate system in response to the coordinate system update signal, in a manner similar to block 1455.

In block 1485, the UE may report or otherwise notify the network node of the coordinate system update. In block 1480, the network node may receive the coordinate system update.

One or both of the processes illustrated in FIGS. 14B, 14C may be implemented. Note that the network node and/or the UE may perform blocks illustrated in FIGS. 14B, 14C independently of blocks illustrated in FIG. 14A.

Figure 15:
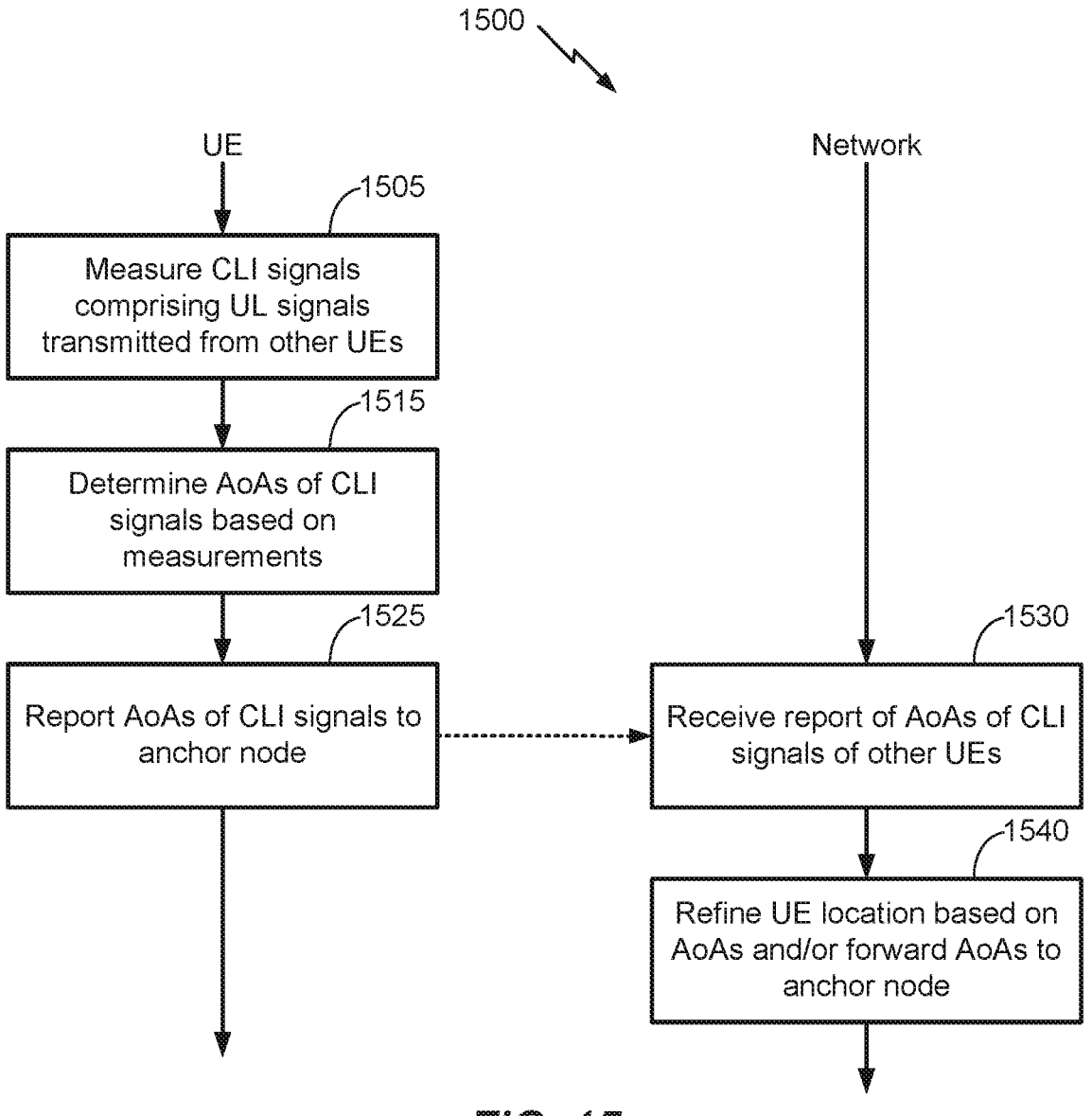
FIG. 15 illustrates another exemplary method performed by a UE and a base station for CLI enabled AoA estimation.

FIG. 15 illustrates another exemplary method 1500 performed by a UE and a network node (e.g., gNB, location server, LMF, etc.) to enable CLI-based AoA estimation at the UE. Again, the dashed arrows indicate directions of communications between the UE and the network.

In block 1505, the UE may receive CLI signals from one or more other UE (e.g., aggressor UEs) and measure the received CLI signals. Again, the CLI signals may comprise UL signals transmitted from one or more other UEs to the base station (e.g., a network node) during one or more CLI opportunities. The one or more CLI opportunities may comprise measurement resources that coincide with the UL transmissions from the other UEs corresponding to the one or more CLI signals.

In block 1515, the UE may estimate or otherwise determine the AoAs of the CLI signals based on the measurements of the CLI signals.

In block 1525, the UE may report the AoAs of the CLI signals to an anchor node. If the network node is the anchor node, the report may be delivered directly to the network node. Otherwise, the report may be delivered to the anchor node (e.g., location server, LMF, etc.) through the network node. As described above with respect to block 1435, if the selected coordinate system is GCS, the UE may report each AoA as a combination the azimuth φ and zenith θ angles. If the selected coordinate system is LCS, the UE may report each AoA as a combination the azimuth φ and zenith θ angles. The pose information (α, β, γ) may also be provided. The pose information need not accompany each AoA being reported. If the selected coordinate system is based on RDDCS, the UE may report each AoA as an angle relative to the reference data direction. The reference data direction which may also be provided need not accompany each AoA being reported.

In block 1530, the network node may receive the report of the AoAs of the CLI signals from the UE.

In block 1540, the network node may refine the location of the UE based on the AoAs received from the UE. That is, the network node may also function as the anchor node. Alternative or in addition thereto, the network node may forward the received AoAs to another anchor node (e.g., location server, LMF, etc.).

In a perspective, blocks 1505, 1515 and 1525 may be viewed as an example implementation of block 1435 of FIG. 14A. Also in a perspective, blocks 1540 and 1550 may be viewed as an example implementation of block 1440 of FIG. 14A.

While not specifically illustrated in FIG. 15, it should be noted that the UE may send its coordinate system capability to the network node, the network node may select the coordinate system, and the network node may also configure CLI resources for the UE. Also, the UE may update the coordinate system, and the update may be triggered by the UE and/or the network node.

Figure 16:
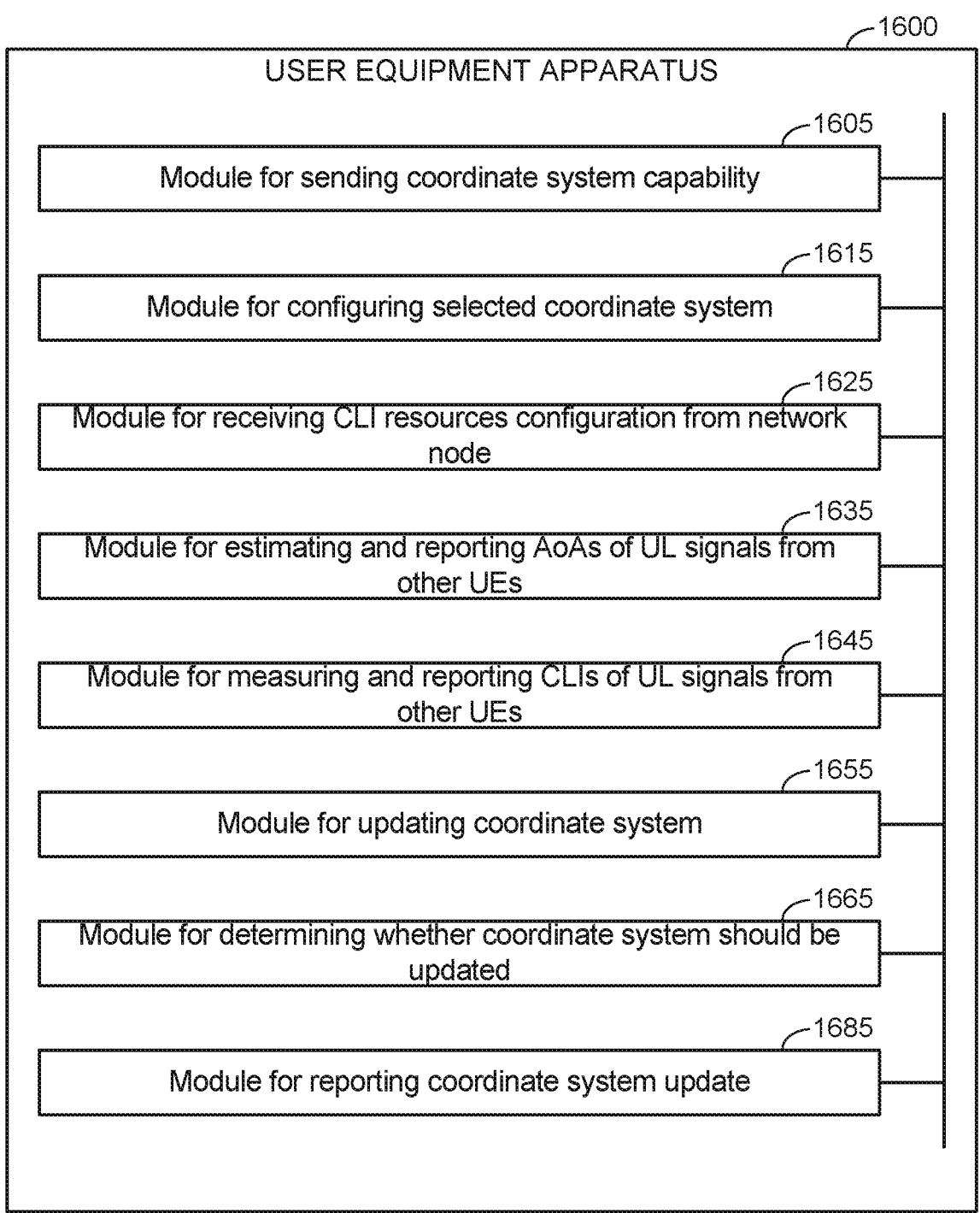
FIGS. 16 and 17 are other simplified block diagrams of several sample aspects of apparatuses configured to support positioning and communication as taught herein.

FIG. 16 illustrates an example user equipment apparatus 1600 represented as a series of interrelated functional modules connected by a common bus. Each of the modules may be implemented in hardware or as a combination of hardware and software. For example, the modules may be implemented as any combination of the apparatus 302. A module for sending coordinate system capability 1605 may correspond at least in some aspects to a processing system 332, a memory component 338, and/or a communication device 308 of the apparatus 302. A module for configuring selected coordinate system capability 1615 may correspond at least in some aspects to a processing system 332 and/or a memory component 338 of the apparatus 302. A module for receiving CLI resources configuration from the network node 1625 may correspond at least in some aspects to a processing system 332, a memory component 338, and/or a communication device 308 of the apparatus 302. A module for estimating and reporting AoAs of UL signals from other UEs 1635 may correspond at least in some aspects to a processing system 332, a memory component 338, a measuring component 352, and/or a communication device 308 of the apparatus 302. A module for measuring and reporting CLIs of UL signals from other UEs 1645 may correspond at least in some aspects to a processing system 332, a memory component 338, a measuring component 352, and/or a communication device 308 of the apparatus 302. A module for updating the coordinate system 1655 may correspond at least in some aspects to a processing system 332 and/or a memory component 338. A module for determining whether the coordinate system should be updated 1665 may correspond at least in some aspects to a processing system 332, a memory component 338, and/or a measuring component 352 of the apparatus 302. A module for reporting coordinate system update 1685 may correspond at least in some aspects to a processing system 332, a memory component 338, and/or a communication device 308 of the apparatus 302.

Figure 17:
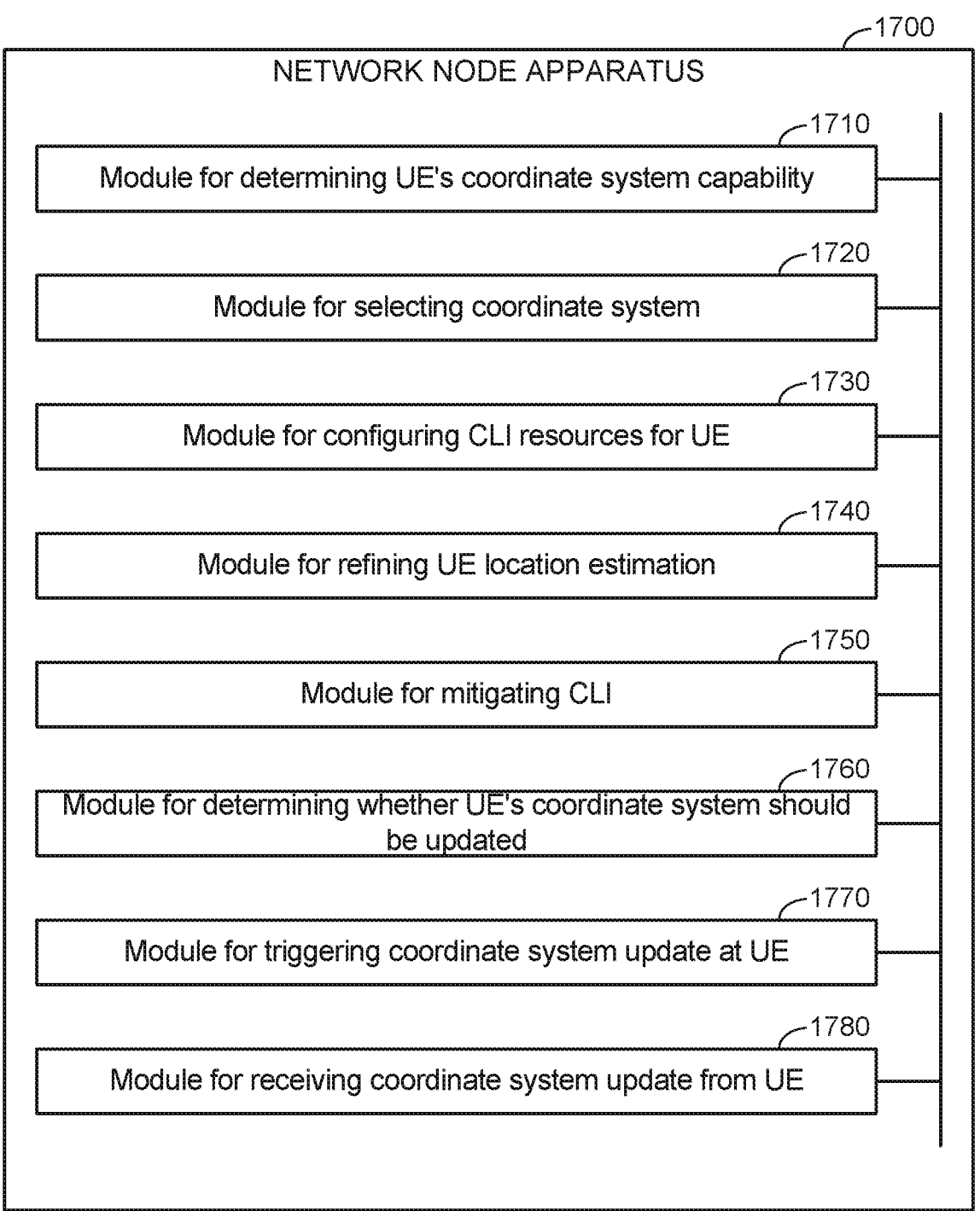

FIG. 17 illustrates an example network node apparatus 1700 represented as a series of interrelated functional modules connected by a common bus. Each of the modules may be implemented in hardware or as a combination of hardware and software. For example, the modules may be implemented as any combination of the apparatus 304 or of the apparatus 306. A module for determining UE's coordinate system capability 1710 may correspond at least in some aspects to a communication device 314, a processing system 334, and/or a memory component 340 of the apparatus 304, or may correspond at least in some aspects to a communication device 326, a processing system 336, and/or a memory component 342 of the apparatus 306. A module for selecting the coordinate system 1720 may correspond at least in some aspects to a processing system 334 and/or a memory component 340 of the apparatus 304, or may correspond at least in some aspects to a processing system 336 and/or a memory component 342 of the apparatus 306. A module for configuring CLI resources for a UE 1730 may correspond at least in some aspects to a processing system 334 and/or a memory component 340 of the apparatus 304, or may correspond at least in some aspects to a processing system 336 and/or a memory component 342 of the apparatus 306. A module for refining UE location estimation 1740 may correspond at least in some aspects to a communication device 314, a processing system 334, and/or a memory component 340 of the apparatus 304, or may correspond at least in some aspects to a communication device 326, a processing system 336, and/or a memory component 342 of the apparatus 306. A module for mitigating CLI 1750 may correspond at least in some aspects to a measurement component 354, a processing system 334, and/or a memory component 340 of the apparatus 304, or may correspond at least in some aspects to a measurement component 356, a processing system 336, and/or a memory component 342 of the apparatus 306. A module for whether UE's coordinate system should be updated 1760 may correspond at least in some aspects to a communication device 320, a measurement component 354, a processing system 334, and/or a memory component 340 of the apparatus 304, or may correspond at least in some aspects to a communication device 326, a measurement component 356, a processing system 336, and/or a memory component 342 of the apparatus 306. A module for triggering coordinate system update at UE 1770 may correspond at least in some aspects to a communication device 314, a processing system 334, and/or a memory component 340 of the apparatus 304, or may correspond at least in some aspects to a communication device 326, a processing system 336, and/or a memory component 342 of the apparatus 306. A module for sending a measurement request 1780 may correspond at least in some aspects to a communication device 314, a processing system 334, and/or a memory component 340 of the apparatus 304, or may correspond at least in some aspects to a communication device 326, a processing system 336, and/or a memory component 342 of the apparatus 306.

The functionality of the modules of FIGS. 15-17 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 15-17, as well as other components and functions described herein, may be implemented using any suitable means. Such means also may be implemented, at least in part, using corresponding structure as taught herein. For example, the components described above in conjunction with the "module for" components of FIGS. 15-17 also may correspond to similarly designated "means for" functionality. Thus, in some aspects one or more of such means may be implemented using one or more of processor components, integrated circuits, or other suitable structure as taught herein.

Implementation examples are described in the following numbered clauses:

Clause 1: A method of a user equipment (UE), the method comprising: receiving cross-link interference (CLI) resources configuration from a network node, the CLI resources configuration specifying CLI opportunities comprising resources scheduled for the UE to measure one or more uplink (UL) signals from corresponding one or more other UEs; and estimating and reporting one or more angles-of-arrival (AoAs) of the one or more uplink (UL) signals of the one or more other UEs received during the CLI opportunities.

Clause 2: The method of clause 1, wherein the one or more AoAs are reported based on a coordinate system, the coordinate system being one of a global coordinate system (GCS), a local coordinate system (LCS), or a reference data direction coordinate system (RDCS), wherein when the coordinate system is the GCS, each AoA is represented as a combination of azimuth angle $\phi$ and zenith angle $\theta$, where $\phi=0$ points to geographical north and is positive in a counter-clockwise direction, and where $\theta=0$ points to zenith and $\theta=90$ points to horizon, wherein when the coordinate system is the LCS, each AoA is represented as a combination of azimuth angle $\phi$ and zenith angle $\theta$, where $\phi=0$ points to x-axis and is positive in a counter-clockwise direction, and where $\theta=0$ points to z-axis and $\theta=90$ points to x-y plane, and wherein when the coordinate system is the RDDCS, each AoA is represented a relative angle different from a reference data direction.

Clause 3: The method of clause 2, wherein the reference data direction of the RDDCS is a direction of a downlink beam from the network node to the UE, a direction of an uplink beam from the UE to the network node, and/or a direction of a Uu channel between the UE and the network node.

Clause 4: The method of any of clauses 1-3, further comprising: configuring the UE with a coordinate system selected by the network node prior to receiving the CLI resources configuration from a network node.

Clause 5: The method of clause 4, wherein the selection of the coordinate system is received from the network node in a radio resource control (RRC) signaling, a downlink control information (DCI) signaling, or a medium access control (MAC) control element (CE) signaling.

Clause 6: The method of any of clauses 4-5, further comprising: sending a coordinate system capability of the UE to the network node prior to configuring the UE with the coordinate system selected by the network node Clause 7: The method of clause 6, wherein the coordinate system capability of the UE is sent in an information element or is a UE type is provided.

Clause 8: The method of any of clauses 1-7, further comprising: measuring and reporting CLIs of the one or more UL signals of the one or more other UEs received during the CLI opportunities.

Clause 9: The method of any of clauses 1-8, further comprising: updating a coordinate system of the UE when a coordinate system update trigger is received from the network node.

Clause 10: The method of any of clauses 1-9, further comprising: determining whether to update the coordinate system of the UE; and updating the coordinate system of the UE when it is determined to update the coordinate system of the UE.

Clause 11: The method of clause 10, wherein it is determined to update the coordinate system when any one or more of the following are true: when a change in a location the UE since a last coordinate system update exceeds a LocationDeltaThreshold, when a change in strength and/or quality of a signal from the network node exceeds a StrengthQualityDeltaThreshold, when an AoA estimation event occurs, and/or when CLI resources are newly configured.

Clause 12: The method of any of clauses 10-11, further comprising: reporting the coordinate system update to the network node.

Clause 13: The method of any of clauses 1-12, wherein the each of the one or more UL signals comprises any one or more of a physical uplink control channel (PUCCH) signal, a physical uplink shared channel (PUSCH) signal, physical random access channel (PRACH) preamble, and/or a sounding reference signal (SRS).

Clause 14: The method of a network node, the method comprising: configuring cross-link interference (CLI) resources for a user equipment (UE), the CLI resources configuration specifying CLI opportunities comprising resources scheduled for the UE to measure one or more uplink (UL) signals from corresponding one or more other UEs; and refining a location of the UE based on one or more angles-of-arrival (AoAs) of the one or more uplink (UL) signals of the one or more other UEs received by the UE during the CLI opportunities.

Clause 15: The method clause 14, wherein the one or more AoAs are reported based on a coordinate system, the coordinate system being one of a global coordinate system (GCS), a local coordinate system (LCS), or a reference data direction coordinate system (RDCS), wherein when the coordinate system is the GCS, each AoA is represented as a combination of azimuth angle $\phi$ and zenith angle $\theta$, where $\phi=0$ points to geographical north and is positive in a counterclockwise direction, and where $\theta=0$ points to zenith and $\theta=90$ points to horizon, wherein when the coordinate system is the LCS, each AoA is represented as a combination of azimuth angle $\phi$ and zenith angle $\theta$, where $\phi=0$ points to x-axis and is positive in a counter-clockwise direction, and where $\theta=0$ points to z-axis and $\theta=90$ points to x-y plane, and wherein when the coordinate system is the RDDCS, each AoA is represented a relative angle different from a reference data direction.

Clause 16: The method of clause 15, wherein the reference data direction of the RDDCS is a direction of a downlink beam from the network node to the UE, a direction of an uplink beam from the UE to the network node, and/or a direction of a Uu channel between the UE and the network node.

Clause 17: The method of any of clauses 14-16, further comprising: selecting the coordinate system for the UE prior to configuring the CLI resources for the UE.

Clause 18: The method of clause 17, wherein the selection of the coordinate system is sent to the UE in a radio resource control (RRC) signaling, a downlink control information (DCI) signaling, or a medium access control (MAC) control element (CE) signaling.

Clause 19: The method any of clauses 17-18, further comprising: receiving a coordinate system capability from the UE prior to selecting the coordinate system for the UE.

Clause 20: The method of clause 19, wherein the coordinate system capability of the UE is received in an information element or is a UE type is received.

Clause 21: The method of any of clauses 14-20, further comprising: mitigating the CLI based on a CLI measurement report received from the UE, the CLI measurement report comprising CLIs of the one or more UL signals of the one or more other UEs received during the CLI opportunities.

Clause 22. The method of any of clauses 14-21, further comprising: determining whether to the coordinate system of the UE should be updated; and triggering the UE to update the coordinate system when it is determined that the coordinate system of the UE should be updated.

Clause 23: The method of clause 22, wherein it is determined that the coordinate system of the UE should be updated when any one or more of the following are true: when an UpdateDurationThreshold has passed since a last coordinate system update, when a change in speed and/or a location the UE since the last coordinate system update exceeds a SpeedLocationDeltaThreshold, when a change in Uu channel direction since the last coordinate system update exceeds a UuDeltaThreshold, when an AoA estimation event occurs, and/or when CLI resources are newly configured.

Clause 24: The method of any of clauses 14-23, further comprising: receiving a report of a coordinate system update from the UE.

Clause 25: The method of any of clauses 14-24, wherein the each of the one or more UL signals comprises any one or more of a physical uplink control channel (PUCCH) signal, a physical uplink shared channel (PUSCH) signal, physical random access channel (PRACH) preamble, and/or a sounding reference signal (SRS).

Clause 26: A user equipment comprising at least one means for performing a method of any of clauses 1-13.

Clause 27: A network node comprising at least one means for performing a method of any of clauses 14-25.

Clause 28: A user equipment comprising a processor and a memory coupled with the processor, the processor and memory configured perform a method of clauses 1-13.

Clause 29: A network node comprising a processor and a memory coupled with the processor, the processor and memory configured perform a method of clauses 14-25.

Clause 30: A non-transitory computer-readable medium storing code for a user equipment comprising a processor, a memory coupled with the processor, and instructions stored in the memory and executable by the processor to cause the user equipment to perform a method of any of clauses 1-13.

Clause 31: A non-transitory computer-readable medium storing code for a network node comprising a processor, a memory coupled with the processor, and instructions stored in the memory and executable by the processor to cause the network node to perform a method of any of clauses 14-25.

Clause 32: A method of a user equipment (UE), the method comprising: measuring one or more cross-link interference (CLI) signals comprising one or more uplink (UL) signals transmitted from one or more other UEs to a network node during one or more CLI opportunities, the one or more CLI opportunities comprising measurement resources that coincide with UL transmissions corresponding to the one or more CLI signals; determining one or more angles-of-arrival (AoA) of the one or more CLI signals based on measurements of the one or more CLI signals; and reporting the one or more AoAs of the one or more CLI signals to an anchor node.

Clause 33: The method of clause 32, wherein the one or more AoAs are reported based on a coordinate system, and wherein when the coordinate system is a reference data direction coordinate system (RDDCS), each AoA is reported as an angle relative to a reference data direction.

Clause 34: The method of clause 33, wherein the reference data direction of the RDDCS is a direction of a downlink beam from the network node to the UE, a direction of an uplink beam from the UE to the network node, and/or a direction of a Uu channel between the UE and the network node.

Clause 35: The method of any of clauses 33-34, further comprising: receiving a selection of the coordinate system from the network node prior to measuring the one or more CLI signals; and configuring the UE with the coordinate system selected by the network node.

Clause 36: The method of clause 35, further comprising: sending a coordinate system capability of the UE to the network node prior to receiving the selection of the coordinate system from the network node.

Clause 37: The method of clause 36, wherein the coordinate system capability of the UE is sent in an information element (IE) or is provided by a UE type.

Clause 38: The method of any of clauses 35-37, wherein the coordinate system is one of the RDDCS, a global coordinate system (GCS), or a local coordinate system (LCS), when the coordinate system is the GCS, each AoA is reported as a combination of azimuth $\phi$ and zenith $\theta$ angles, where $\phi=0$ points to geographical north and is positive in a counter-clockwise direction, and where $\theta=0$ points to zenith and $\theta=90$ points to horizon, and wherein when the coordinate system is the LCS, each AoA is reported as a combination of azimuth $\phi$ and zenith $\theta$ angles, where $\phi=0$ points to x-axis and is positive in a counter-clockwise direction, and where $\theta=0$ points to z-axis and $\theta=90$ points to x-y plane.

Clause 39: The method of any of clauses 33-38, further comprising: updating the coordinate system in response to a coordinate system update trigger received from the network node.

Clause 40: The method of any of clauses 33-39, further comprising: determining whether to update the coordinate system; and updating the coordinate system in response to the determination to update the coordinate system.

Clause 41: The method of clause 40, wherein it is determined to update the coordinate system in response to any one or more of the following conditions being true: a change in a location of the UE since a last coordinate system update exceeds a LocationDeltaThreshold, a change in strength and/or quality of a signal from the network node exceeds a StrengthQualityDeltaThreshold, an AoA estimation event occurs, CLI resources are newly configured, or any combination thereof.

Clause 42: The method of any of clauses 40-41, further comprising: reporting the update of the coordinate system to the network node.

Clause 43: The method of any of clauses 32-42, further comprising: receiving CLI resources configuration from the network node prior to measuring the one or more CLI signals, the CLI resources configuration specifying the CLI opportunities; and configuring the UE with the CLI resources configuration.

Clause 44: The method of any of clauses 32-43, wherein the each of the one or more CLI signals comprises any one or more of a physical uplink control channel (PUCCH) signal, a physical uplink shared channel (PUSCH) signal, physical random access channel (PRACH) preamble, and/or a sounding reference signal (SRS).

Clause 45: The method of any of clauses 32-44, wherein the anchor node is a base station, a location server, or a location management function (LMF).

Clause 46: A method of a network node, the method comprising: receiving, from a user equipment (UE), a report of one or more angles-of-arrival (AoA) of one or more cross-link interference (CLI) signals at the UE, the one or more CLI signals comprising one or more uplink (UL) signals transmitted from one or more other UEs to the network node during one or more CLI opportunities, the one or more CLI opportunities comprising measurement resources that coincide with UL transmissions corresponding to the one or more CLI signals; and refining a location of the UE based on the one or more AoAs or forwarding the one or more AoAs to an anchor node or both.

Clause 47: The method of clause 46, wherein the one or more AoAs are reported based on a coordinate system, and wherein when the coordinate system is a reference data direction coordinate system (RDDCS), each AoA is reported as an angle relative to a reference data direction.

Clause 48: The method of clause 47, wherein the reference data direction of the RDDCS is a direction of a downlink beam from the network node to the UE, a direction of an uplink beam from the UE to the network node, and/or a direction of a Uu channel between the UE and the network node.

Clause 49: The method of any of clauses 47-48, further comprising: sending a selection of a coordinate system to the UE prior to receiving the report.

Clause 50: The method of clause 49, further comprising: receiving a coordinate system capability of the UE to the network node prior to sending the selection of the coordinate system to the UE.

Clause 51: The method of clause 50, wherein the coordinate system capability of the UE is received in an information element (IE) or is a UE type is received.

Clause 52: The method of any of clauses 49-51, wherein the coordinate system is one of the RDDCS, a global coordinate system (GCS), or a local coordinate system (LCS), when the coordinate system is the GCS, each AoA is reported as a combination of azimuth $\phi$ and zenith $\theta$ angles, where $\phi=0$ points to geographical north and is positive in a counter-clockwise direction, and where $\theta=0$ points to zenith and $\theta=90$ points to horizon, and wherein when the coordinate system is the LCS, each AoA is reported as a combination of azimuth $\phi$ and zenith $\theta$ angles, where $\phi=0$ points to x-axis and is positive in a counter-clockwise direction, and where $\theta=0$ points to z-axis and $\theta=90$ points to x-y plane.

Clause 53: The method of any of clauses 47-52, further comprising: determining whether the coordinate system should be updated; and triggering the UE to update the coordinate system in response to the determination to update the coordinate system.

Clause 54: The method of clause 53, wherein it is determined that the coordinate system should be updated in response to any one or more of the following conditions being true: an UpdateDurationThreshold has passed since a last coordinate system update, a change in speed and/or a location the UE since the last coordinate system update exceeds a SpeedLocationDeltaThreshold, a change in Uu channel direction since the last coordinate system update exceeds a UuDeltaThreshold, an AoA estimation event occurs, CLI resources are newly configured, or any combination thereof.

Clause 55: The method of any of clauses 47-55, further comprising: receiving a report of the update of the coordinate system from the UE.

Clause 56: The method of any of clauses 46-55, further comprising: sending CLI resources configuration to the UE prior to receiving the report, the CLI resources configuration specifying the CLI opportunities.

Clause 57: The method of any of clauses 46-56, wherein the each of the one or more CLI signals comprises any one or more of a physical uplink control channel (PUCCH) signal, a physical uplink shared channel (PUSCH) signal, physical random access channel (PRACH) preamble, and/or a sounding reference signal (SRS).

Clause 58: The method of any of clauses 46-57, wherein the anchor node is a base station, a location server, or a location management function (LMF).

Clause 59: A user equipment comprising at least one means for performing a method of any of clauses 32-45.

Clause 60: A network node comprising at least one means for performing a method of any of clauses 46-58.

Clause 61: A user equipment comprising a processor and a memory coupled with the processor, the processor and memory configured perform a method of clauses 32-45.

Clause 62: A network node comprising a processor and a memory coupled with the processor, the processor and memory configured perform a method of clauses 46-58.

Clause 63: A non-transitory computer-readable medium storing code for a user equipment comprising a processor, a memory coupled with the processor, and instructions stored in the memory and executable by the processor to cause the user equipment to perform a method of any of clauses 32-45.

Clause 64: A non-transitory computer-readable medium storing code for a network node comprising a processor, a memory coupled with the processor, and instructions stored in the memory and executable by the processor to cause the network node to perform a method of any of clauses 46-58.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a processor;
a memory; and
a transceiver configured to receive one or more cross-link interference (CLI) signals comprising one or more uplink (UL) signals transmitted from one or more other UEs to a network node, wherein the processor is coupled to the memory and the transceiver and configured to:
    measure the received one or more CLI signals during one or more CLI opportunities, the one or more CLI opportunities comprising measurement resources that are configured by the network node to enable the UE to measure the one or more CLI signals and that coincide with UL transmissions corresponding to the one or more CLI signals;
    determine one or more angles-of-arrival (AoA) of the one or more CLI signals based on measurements of the one or more CLI signals to determine a location of the UE; and
    report the one or more AoAs of the one or more CLI signals to an anchor node.

2. The UE of claim 1,
wherein the one or more AoAs are reported based on a coordinate system, and
wherein when the coordinate system is a reference data direction coordinate system (RDDCS), each AoA is reported as an angle relative to a reference data direction.

3. The UE of claim 2, wherein the reference data direction of the RDDCS is a direction of a downlink beam from the network node to the UE, a direction of an uplink beam from the UE to the network node, and/or a direction of an interface channel between the UE and the network node.

4. The UE of claim 2, wherein the processor is further configured to:
    receive a selection of the coordinate system from the network node prior to measuring the one or more CLI signals; and
    configure the UE with the coordinate system selected by the network node.

5. The UE of claim 4, wherein the processor is further configured to:
    send a coordinate system capability of the UE to the network node prior to receiving the selection of the coordinate system from the network node.

6. The UE of claim 5, wherein the coordinate system capability of the UE is sent in an information element (IE) or is provided by a UE type.

7. The UE of claim 4, wherein the coordinate system is one of the RDDCS, a global coordinate system (GCS), or a local coordinate system (LCS),
    when the coordinate system is the GCS, each AoA is reported as a combination of azimuth $\phi$ and zenith $\theta$ angles, where $\phi=0$ points to geographical north and is positive in a counter-clockwise direction, and where $\theta=0$ points to zenith and $\theta=90$ points to horizon, and
    wherein when the coordinate system is the LCS, each AoA is reported as a combination of azimuth $\phi$ and zenith $\theta$ angles, where $\phi=0$ points to x-axis and is positive in a counter-clockwise direction, and where $\theta=0$ points to z-axis and $\theta=90$ points to x-y plane.

8. The UE of claim 2, wherein the processor is further configured to:
    update the coordinate system in response to a coordinate system update trigger received from the network node.

9. The UE of claim 2, wherein the processor is further configured to:
    determine whether to update the coordinate system; and
    update the coordinate system in response to the determination to update the coordinate system.

10. The UE of claim 9, wherein it is determined to update the coordinate system in response to any one or more of the following conditions being true:
    a change in the location of the UE since a last coordinate system update exceeds a LocationDeltaThreshold,
    a change in strength and/or quality of a signal from the network node exceeds a StrengthQualityDeltaThreshold,
    an AoA estimation event occurs,
    CLI resources are newly configured, or
    any combinations thereof.

11. The UE of claim 9, wherein the processor is further configured to:
    report the update of the coordinate system to the network node.

12. The UE of claim 1, wherein the processor is further configured to:
    receive CLI resources configuration from the network node prior to measuring the one or more CLI signals, the CLI resources configuration specifying the CLI opportunities; and
    configure the UE with the CLI resources configuration.

13. The UE of claim 1, wherein the each of the one or more CLI signals comprises any one or more of a physical uplink control channel (PUCCH) signal, a physical uplink shared channel (PUSCH) signal, physical random access channel (PRACH) preamble, and/or a sounding reference signal (SRS).

14. The UE of claim 1, wherein the anchor node is a base station, a location server, or a location management function (LMF).

15. A method of a user equipment (UE), the method comprising:
    receiving one or more cross-link interference (CLI) signals comprising one or more uplink (UL) signals transmitted from one or more other UEs to a network node;
    measuring the received one or more CLI signals during one or more CLI opportunities, the one or more CLI opportunities comprising measurement resources that are configured by the network node to enable the UE to measure the one or more CLI signals and that coincide with UL transmissions corresponding to the one or more CLI signals;

determining one or more angles-of-arrival (AoA) of the one or more CLI signals based on measurements of the one or more CLI signals to determine a location of the UE; and reporting the one or more AoAs of the one or more CLI signals to an anchor node.

16. The method of claim 15, wherein the one or more AoAs are reported based on a coordinate system, and wherein when the coordinate system is a reference data direction coordinate system (RDDCS), each AoA is reported as an angle relative to a reference data direction.

17. The method of claim 16, wherein the reference data direction of the RDDCS is a direction of a downlink beam from the network node to the UE, a direction of an uplink beam from the UE to the network node, and/or a direction of an interface channel between the UE and the network node.

18. The method of claim 16, further comprising:

receiving a selection of the coordinate system from the network node prior to measuring the one or more CLI signals; and configuring the UE with the coordinate system selected by the network node.

19. The method of claim 18, further comprising:

sending a coordinate system capability of the UE to the network node prior to receiving the selection of the coordinate system from the network node.

20. The method of claim 19, wherein the coordinate system capability of the UE is sent in an information element (IE) or is provided by a UE type.

21. The method of claim 18, wherein the coordinate system is one of the RDDCS, a global coordinate system (GCS), or a local coordinate system (LCS), when the coordinate system is the GCS, each AoA is reported as a combination of azimuth $\phi$ and zenith $\theta$ angles, where $\phi=0$ points to geographical north and is positive in a counter-clockwise direction, and where $\theta=0$ points to zenith and $\theta=90$ points to horizon, and wherein when the coordinate system is the LCS, each AoA is reported as a combination of azimuth $\phi$ and zenith $\theta$ angles, where $\phi=0$ points to x-axis and is positive in a counter-clockwise direction, and where $\theta=0$ points to z-axis and $\theta=90$ points to x-y plane.

22. The method of claim 16, further comprising:

updating the coordinate system in response to a coordinate system update trigger received from the network node.

23. The method of claim 16, further comprising:

determining whether to update the coordinate system; and updating the coordinate system in response to a determination to update the coordinate system.

24. The method of claim 23, wherein it is determined to update the coordinate system in response to any one or more of the following conditions being true:

a change in the location of the UE since a last coordinate system update exceeds a LocationDelta Threshold, a change in strength and/or quality of a signal from the network node exceeds a StrengthQualityDeltaThreshold, an AoA estimation event occurs, CLI resources are newly configured, or any combinations thereof.

25. The method of claim 23, further comprising:

reporting the update of the coordinate system to the network node.

26. The method of claim 15, further comprising:

receiving CLI resources configuration from the network node prior to measuring the one or more CLI signals, the CLI resources configuration specifying the CLI opportunities; and configuring the UE with the CLI resources configuration.

27. The method of claim 15, wherein the each of the one or more CLI signals comprises any one or more of a physical uplink control channel (PUCCH) signal, a physical uplink shared channel (PUSCH) signal, physical random access channel (PRACH) preamble, and/or a sounding reference signal (SRS).

28. The method of claim 15, wherein the anchor node is a base station, a location server, or a location management function (LMF).

29. A user equipment (UE), comprising:

means for receiving one or more cross-link interference (CLI) signals comprising one or more uplink (UL) signals transmitted from one or more other UEs to a network node;

means for measuring the received one or more CLI signals during one or more CLI opportunities, the one or more CLI opportunities comprising measurement resources that are configured by the network node to enable the UE to measure the one or more CLI signals and that coincide with UL transmissions corresponding to the one or more CLI signals;

means for determining one or more angles-of-arrival (AoA) of the one or more CLI signals based on measurements of the one or more CLI signals to determine a location of the UE; and means for reporting the one or more AoAs of the one or more CLI signals to an anchor node.

30. A non-transitory computer-readable medium storing computer-executable instructions for a user equipment (UE), the computer-executable instructions comprising:

one or more instructions instructing the UE to receive one or more cross-link interference (CLI) signals comprising one or more uplink (UL) signals transmitted from one or more other UEs to a network node;

one or more instructions instructing the UE to measure the received one or more CLI signals during one or more CLI opportunities, the one or more CLI opportunities comprising measurement resources that are configured by the network node to enable the UE to measure the one or more CLI signals and that coincide with UL transmissions corresponding to the one or more CLI signals;

one or more instructions instructing the UE to determine one or more angles-of-arrival (AoA) of the one or more CLI signals based on measurements of the one or more CLI signals to determine a location of the UE; and one or more instructions instructing the UE to report the one or more AoAs of the one or more CLI signals to an anchor node.

* * * * *